United States Patent
Ploss et al.

(10) Patent No.: US 10,551,230 B2
(45) Date of Patent: Feb. 4, 2020

(54) MEASURING SYSTEM FOR MEASURING AT LEAST ONE PARAMETER OF A FLUID

(71) Applicant: Endress +Hauser Flowtec AG, Reinach (CH)

(72) Inventors: Peter Ploss, Erlangen (DE); Stefan Rupitsch, Nuremberg (DE); Michael Bezdek, Aesch (CH); Thomas Frohlich, Munchenstein (CH); Beat Kissling, Reinach (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 150 days.

(21) Appl. No.: 15/569,162

(22) PCT Filed: May 9, 2016

(86) PCT No.: PCT/EP2016/060295
§ 371 (c)(1),
(2) Date: Oct. 25, 2017

(87) PCT Pub. No.: WO2016/184709
PCT Pub. Date: Nov. 24, 2016

(65) Prior Publication Data
US 2018/0149505 A1 May 31, 2018

(30) Foreign Application Priority Data

May 18, 2015 (DE) .................. 10 2015 107 750

(51) Int. Cl.
*G01F 1/66* (2006.01)
*G01F 25/00* (2006.01)
(52) U.S. Cl.
CPC .............. *G01F 1/662* (2013.01); *G01F 1/667* (2013.01); *G01F 25/0007* (2013.01)

(58) Field of Classification Search
CPC ........ G01F 1/66; G01F 1/667; G01F 25/0007; G01F 1/662
See application file for complete search history.

(56) References Cited

U.S. PATENT DOCUMENTS 4,144,752 A   3/1979 Lolk
4,735,097 A * 4/1988 Lynnworth ............. G01F 1/662
                                              73/290 V (Continued)

FOREIGN PATENT DOCUMENTS

DE   2648718 C2   12/1978
DE   10057188 A1   5/2002
(Continued)

OTHER PUBLICATIONS

International Search Report, EPO, The Netherlands, dated May 9, 2016.

*Primary Examiner* — David A Rogers
(74) *Attorney, Agent, or Firm* — Bacon & Thomas, PLLC

(57) ABSTRACT

A measuring system, embodied as a clamp-on, ultrasonic, flow measuring device, comprises a tube, or a pipe, having a lumen surrounded by a tube, or pipe, wall, which tube or pipe is adapted to guide a volume portion of the fluid in its lumen; an ultrasonic transducer mounted on the tube, or pipe, on an outside of the tube, or pipe, wall facing away from the lumen, and acoustically coupled via the tube, or pipe, wall to fluid guided in the lumen, and adapted to convert a time varying electrical voltage into ultrasonic waves propagating through the tube, or pipe, wall and further through fluid guided in the lumen; an ultrasonic transducer mounted on the tube, or pipe, separated from the ultrasonic transducer on the outside of the tube, or pipe, wall, and acoustically coupled via the tube, or pipe, wall to fluid guided in the lumen, and adapted to receive ultrasonic (Continued)

waves propagating through fluid guided in the lumen, and further through the tube, or pipe, wall and to transduce such into an electrical voltage varying as a function of time; as well as an operating- and measuring electronics adapted to generate, a driver signal for the ultrasonic transducer. The driver signal has a time variable, electrical voltage, for effecting a received signal, of the ultrasonic transducer likewise having an electrical voltage, $u_{B,IF}$, varying as a function of time, in such a manner that both the driver signal, as well as also the received signal, each contain a plurality of spectral signal components, equally as well, in each case, a dominating spectral signal component having a maximum power spectral density, and that a frequency, of the dominating signal component of the driver signal, deviates by a magnitude of no more than $|\pm 100\ kHz|$ from a frequency of the dominating signal component of the received signal, and/or by no more than 10% of the frequency of the dominating signal component of the received signal, from such frequency. Furthermore, the operating- and measuring electronics is adapted to produce by means of the received signal, at least one measured value for the at least one parameter.

34 Claims, 6 Drawing Sheets

(56) References Cited

U.S. PATENT DOCUMENTS

| | | | |
|---|---|---|---|
| 4,930,358 A * | 6/1990 | Motegi | G01F 1/662 73/861.28 |
| 6,065,350 A | 5/2000 | Hill et al. | |
| 7,124,621 B2 * | 10/2006 | Nevius | G01F 1/66 73/1.16 |
| 7,628,081 B1 * | 12/2009 | Feller | G01F 1/66 73/861.27 |
| 7,673,525 B2 * | 3/2010 | Huang | G01B 17/025 73/861.25 |
| 7,706,986 B2 * | 4/2010 | Frohlich | G01N 29/024 702/48 |
| 8,019,559 B1 * | 9/2011 | Stevens | G01F 1/662 702/45 |
| 8,356,522 B2 * | 1/2013 | Allen | G01F 1/662 73/861.28 |
| 8,626,466 B2 * | 1/2014 | Hackett, III | G01F 1/662 702/100 |
| 8,700,344 B2 * | 4/2014 | Wilson | G01F 1/66 702/48 |
| 9,372,107 B2 * | 6/2016 | Kirst | G01F 25/0007 |
| 9,797,760 B2 * | 10/2017 | Ramsay | G01F 1/66 |
| 9,816,847 B2 * | 11/2017 | Sasaki | G01F 1/667 |
| 9,903,882 B2 * | 2/2018 | Hies | G01F 25/0007 |
| 9,989,387 B2 * | 6/2018 | Black | G01N 29/036 |
| 10,036,763 B2 * | 7/2018 | Hies | G01P 5/244 |
| 10,088,348 B2 * | 10/2018 | Xu | G01F 1/66 |
| 10,145,715 B2 * | 12/2018 | Kuppi | G01F 1/66 |
| 2009/0158858 A1 * | 6/2009 | Gysling | G01F 1/662 73/861.27 |
| 2014/0123767 A1 | 5/2014 | Ao et al. | |
| 2014/0366642 A1 | 12/2014 | Tanaka et al. | |
| 2015/0043612 A1 | 2/2015 | Wiest et al. | |

FOREIGN PATENT DOCUMENTS

| | | |
|---|---|---|
| DE | 102005015456 A1 | 10/2006 |
| DE | 102007062913 A1 | 6/2009 |
| DE | 102015107750 A1 | 11/2016 |
| GB | 2472085 A | 1/2011 |
| GB | 2479115 A | 10/2011 |

* cited by examiner

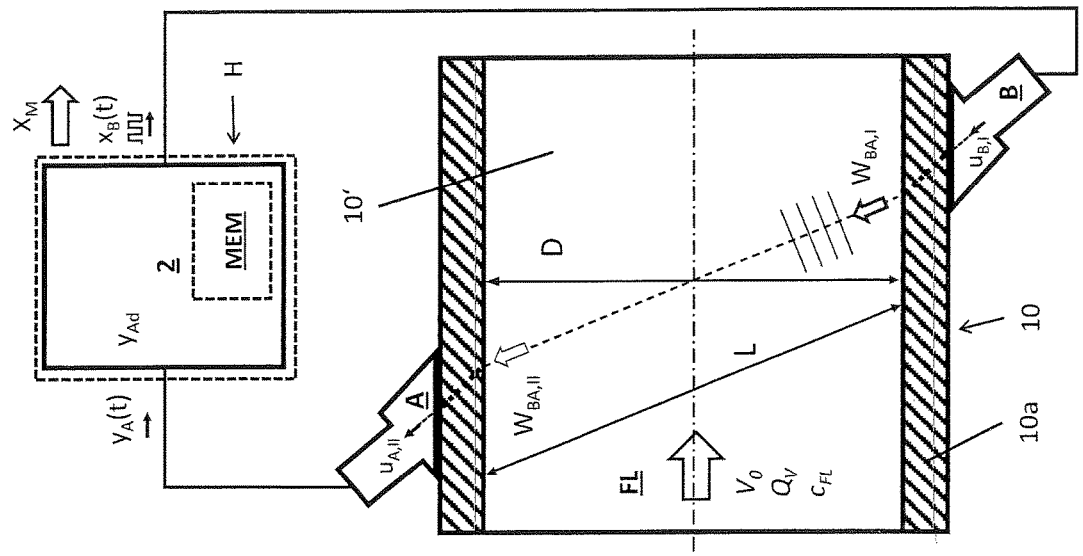
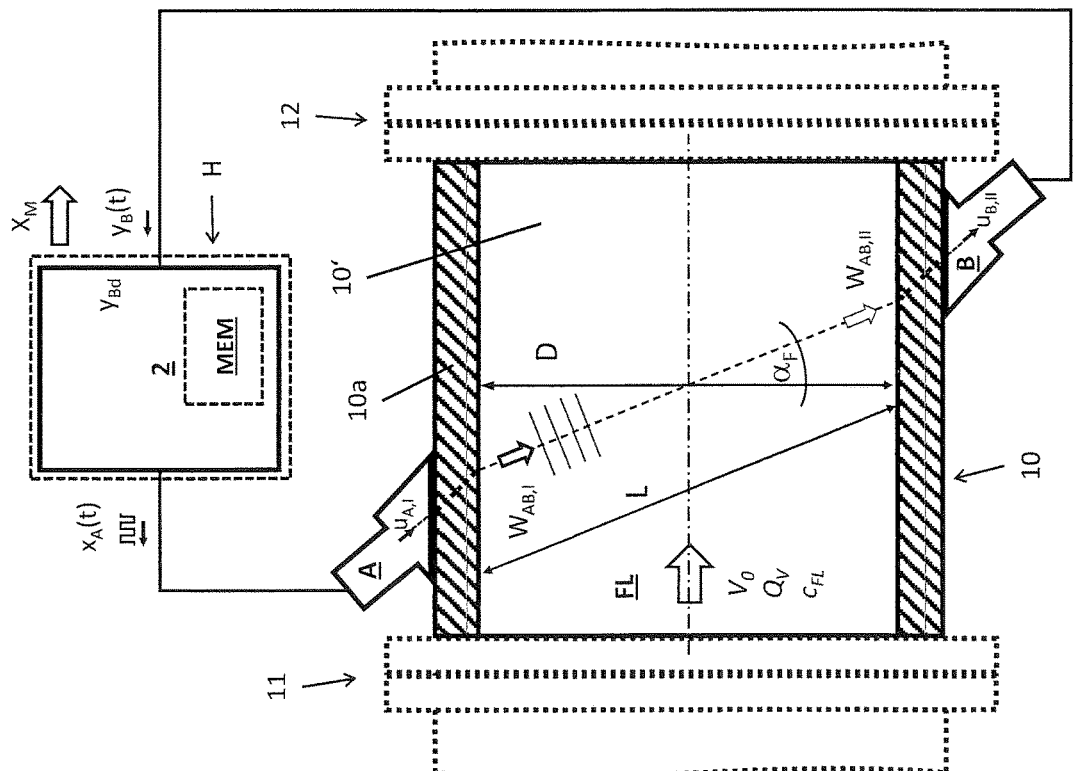
Fig. 1a
Fig. 1b

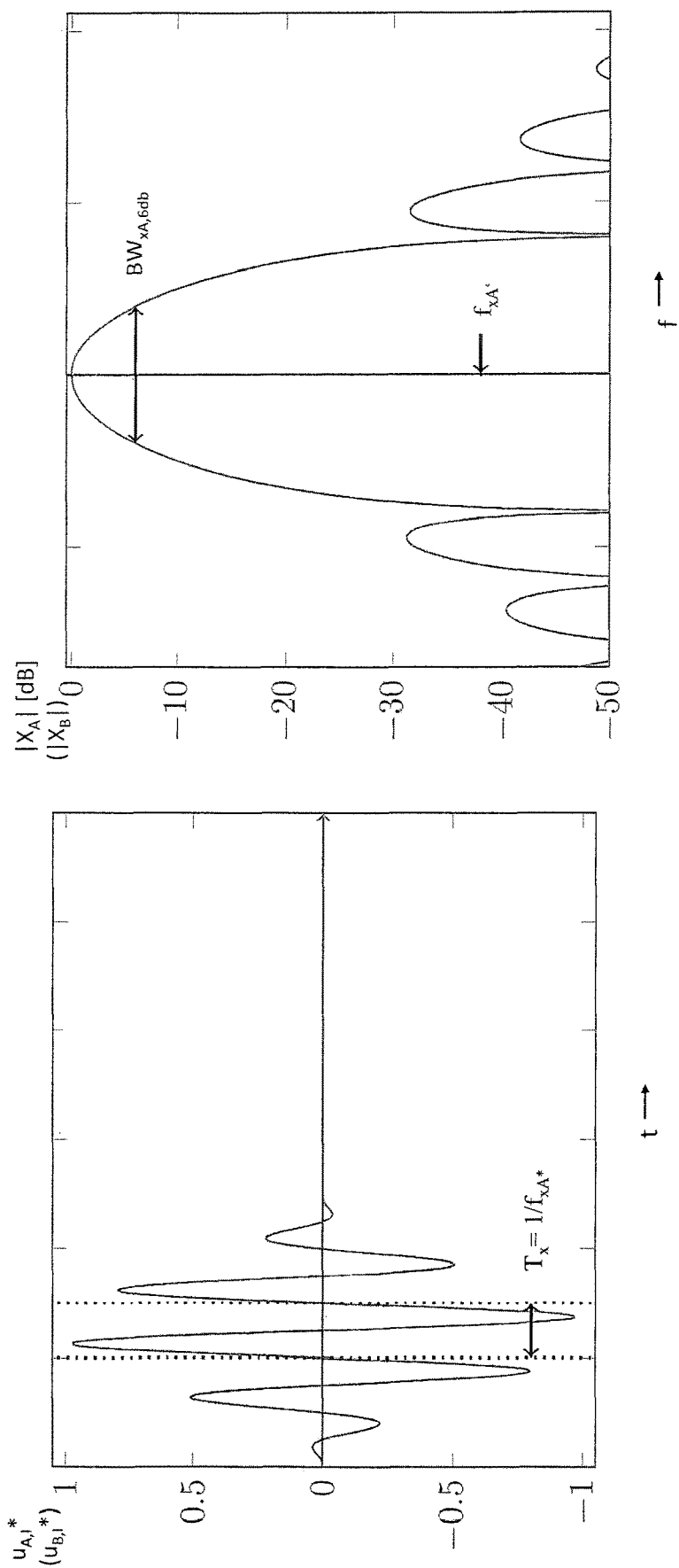

MEASURING SYSTEM FOR MEASURING AT LEAST ONE PARAMETER OF A FLUID

TECHNICAL FIELD

The invention relates to a measuring system, especially a measuring system embodied as a clamp-on, ultrasonic, flow measuring device, for measuring at least one parameter, especially a fluid dynamic parameter, especially a flow velocity and/or a volume flow rate, of a fluid—especially a fluid flowing in a pipeline—especially a fluid in the form of a liquid, a gas, or a dispersion.

BACKGROUND DISCUSSION

Often used in industrial measuring- and automation technology for measuring parameters of fluids flowing in a pipeline, not least of all also fluid dynamic parameters, such as e.g. a flow velocity and/or a volume flow rate, are measuring systems, which are formed by means of at least two mutually spaced, ultrasonic transducers, both externally mounted on a tube, or a pipe, as well as an operating- and measuring electronics electrically connected with each of the two ultrasonic transducers. Such measuring systems are described at length, for example, in German Patents, DE-A 10057188, DE-A 102007062913; US-A 2014/0366642, and US-A 2014/0123767; and Published International Applications, WO-A 03/098166, WO-A 2007/012506, WO-A 2009/156250, WO-A 2012/120039, WO-A 2013/029664, and WO-A 2013/079264; and also in the article published in IEEE TRANSACTIONS ON ULTRASONICS, FERROELECTRICS, AND FREQUENCY CONTROL, VOL. 43, NO. 4, JULY 1996 entitled "Acoustic Transfer Function of the Clamp-On Flowmeter", by Bernhard Funck and Andreas Mitzkus, and are, for example, also available from the applicant in the form of clamp-on, ultrasonic, flow measuring devices under the designations "Proline Prosonic Flow 91W", "Proline Prosonic Flow 93P", "Proline Prosonic Flow 93T", and "Proline Prosonic Flow 93W".

Measuring systems of the type being discussed comprise most often a straight, especially hollow cylindrical, tube, or pipe, having a lumen most often corresponding to a straight circular cylinder and surrounded by a tube, or pipe, wall composed, for example, of a steel, which tube, or pipe, is adapted to guide a volume portion of the fluid in its lumen, i.e. to be flowed through by the fluid. The tube, or pipe, can, in such case, be, for example, a tube, which is inserted into the course of a pipeline, or, for example, also, a pipe subsection of an already existing pipeline, consequently embodied as an integral part of such pipeline. Typical tube, or pipe, wall thicknesses lie, for instance, in a range from 2 mm up to several centimeters.

Each of the at least two ultrasonic transducers is placed, for example, namely secured or clamped, on an outside the tube, or pipe, wall facing away from the lumen of the tube, or pipe, in such a manner that, as a result, each of the ultrasonic transducers is acoustically coupled via the tube, or pipe, wall to fluid guided in the lumen. Furthermore, each of the ultrasonic transducers is adapted to convert an electrical voltage varying as a function of time into ultrasonic waves propagating through the tube, or pipe, wall and further through fluid guided in the lumen of the tube, and to receive ultrasonic waves propagating through fluid guided in the lumen of the tube, or pipe, and further through the tube, or pipe, wall and to transduce such into an electrical voltage varying as a function of time. The at least two ultrasonic transducers are additionally so mutually spaced, positioned on the outside of the tube, or pipe, wall, and so oriented that ultrasonic waves brought about by means of one of the ultrasonic transducers propagate within the fluid located in the lumen partially along a sound propagation path used as measuring path and thereafter acoustically couple via the tube, or pipe, wall into the other ultrasonic transducer.

The most often equally-constructed ultrasonic transducers are typically each formed by means of at least one piezo-electric transducer element, for example, composed of lead-zirconate-titanate ($LZT\text{-}Pb[Zr_xTi_{1-x}]O_3$) or some other piezo-ceramic, as well as by means of a coupling body sound conductingly coupled with the transducer element, for example, a coupling body of polyetherimide (PEI), which is embodied to provide a best possible, sound conducting, equally as well as long term stable, contact between ultrasonic transducer and tube, or pipe. In the case of an ultrasonic transducer used in a measuring system formed as a clamp-on, ultrasonic, flow measuring device, a center frequency lies, currently, typically in a range of, for instance, 0.5-6 MHz at a relative bandwidth, namely a 6 dB-bandwidth referenced to the particular center frequency, for instance, of 20-30% of the particular center frequency.

In the case of industrial measuring systems of the type being discussed, each of the two ultrasonic transducers is typically adapted to be operated in each case intermittently as a transmitter converting electrical power into sound power, and as a receiver transducing sound power into electrical power, i.e. the two ultrasonic transducers are provided to be operated alternately as a transmitter and as a receiver, in such a manner that always only, at most, one of the two ultrasonic transducers is transmitter. For effecting an electrical voltage varying as a function of time useful as a received signal of the ultrasonic transducer operated as receiver, the operating- and measuring electronics generates during operation of the measuring system, at least at times, a driver signal having a time variable, for example, even bipolar, electrical voltage for the other ultrasonic transducer operated, at the moment, as transmitter, for example, in such a manner that the particular driver signal is embodied for the one ultrasonic transducer, at least for a predetermined time interval, complementarily to the driver signal for the other ultrasonic transducer.

Measuring systems of the type being discussed, not least of all also measuring systems embodied as clamp-on, ultrasonic, flow measuring devices serving for measuring fluid dynamic parameters, ascertain the desired measured values often based on travel times ($t_{AB}$, $t_{BA}$), which ultrasonic waves propagating within the lumen of the tube require for traversing the measuring path in the particular sound propagation paths, especially based on travel time differences ($t_{BA} - t_{AB}$), namely based on differences between travel times ($t_{AB}$) of ultrasonic waves propagating along the measuring path in a first measuring direction and travel times ($t_{BA}$) of ultrasonic waves propagating along the measuring path in a second measuring direction opposite to the first measuring direction. For such purpose, the at least two ultrasonic transducers are most often so positioned and so oriented on the outside of the tube, or pipe, wall that the sound propagation path serving as measuring path has a main propagation direction inclined relative to an inner diameter of the tube by a beam angle ($\alpha_F$). A length (L) the measuring path corresponding to a path length of the sound propagation path corresponds, in such case, to a quotient of the inner diameter of the tube divided by the cosine of the beam angle (i.e. $D/\cos \alpha_F$). The two ultrasonic transducers can be positioned, such as shown, for example, in the above mentioned Published International Application, WO-A 2013/079264, for example, on oppositely lying sides of the tube, or pipe, or, however, for example, also, such as shown, for example, in the above mentioned WO-A 2009/156250, respectively WO-A 03/098166, on an imaginary surface element of the tube, or pipe, spaced on the tube, or pipe, along the surface element, typically such that the sound propagation path includes a central region of the tube, or pipe, i.e. its lumen, such that a measured travel-time difference is proportional to an average flow velocity of the fluid. Used for measuring travel time in the case of conventional measuring systems are pulsed ultrasonic waves, namely ultrasonic waves in the form of wave packets having a limited number of oscillations. The wave packets, at times, also referred to as ultrasonic bursts, are generated intermittently with a predeterminable shot rate, which is most often held constant over a longer period of time, for example, in that the driver signal delivered by the operating- and measuring electronics has for the particular ultrasonic transducer a voltage embodied as a sequence of rectangular or sinusoidal voltage pulses (bursts) formed to pulse packets in a rhythm corresponding to the shot rate.

Taking into consideration the velocity of sound ($c_{FL}$) in the fluid located in the lumen, for example, thus 1484 m·s$^{-1}$ in the case of water at 20° C., as well as an instantaneous average flow velocity ($V_0$) of the fluid, the travel times correspond with most often sufficient accuracy to the known formulas:

$$t_{AB} = \frac{L}{c_{FL} + V_0 \cdot \sin\alpha_F}, \text{ and } t_{BA} = \frac{L}{c_{FL} - V_0 \cdot \sin\alpha_F}.$$

Derived therefrom, the fluid dynamic parameters, average flow velocity ($V_0$), and volume flow rate ($Q_V$), can be determined, for example, using the known formulas:

$$V_0 = \frac{L}{2 \cdot \sin\alpha_F} \cdot \frac{t_{ba} - t_{ab}}{t_{ab} \cdot t_{ba}},$$

$$\text{and } Q_V = \frac{\pi}{4} \cdot K \cdot D^2 \cdot V_0 = \frac{\pi}{4} \cdot K \cdot D^2 \cdot \frac{L}{2 \cdot \sin\alpha_F} \cdot \frac{t_{ba} - t_{ab}}{t_{ab} \cdot t_{ba}},$$

respectively. Also the velocity of sound characterizing the material of the fluid can be determined, for example, based on the formula:

$$c_{FL} = \frac{L}{2} \cdot \left( \frac{1}{t_{ab}} + \frac{1}{t_{ba}} \right).$$

The beam angle and, associated therewith, the path length are established, for example, by the orientation of the ultrasonic transducer relative to the pipe as well as by velocities of sound relevant in the measuring system for the sound propagation and by acoustic impedances of the measuring system. Knowing the actual structure of the measuring system and the velocities of sound ($c_i$), and wave numbers ($k_i$), of the utilized materials, including the fluid guided in the lumen of the tube, the beam angle can be earlier calculated in the form of a nominal beam angle ($\alpha_{F,nom}$), for example, using a beam acoustic model assuming planar wave fronts, based on Snell's law of refraction for acoustics, in order thereafter to be taken into consideration for ascertaining the measured value for the at least one parameter. Derived from the nominal beam angle ($\alpha_{F,nom}$), additionally also the path length can be nominally determined. Typically, the nominal beam angle and the nominal path length are established on-site, for instance, numerically ascertained in the course of a start-up of the measuring system, for example, based on the structure of the respective measuring system, data characterizing the system, as well as corresponding nominal material parameters for the tube, or pipe, and the fluid. In the case of clamp-on, ultrasonic, flow measuring devices for measuring fluid dynamic parameters of aqueous measuring systems, the nominal beam angle lies, for example, frequently at, for instance, 20°.

In order actually to achieve the high accuracy required for industrial measuring systems of the type being discussed, i.e. an accuracy with which the at least one parameter is to be measured, thus to be able to maintain correspondingly required, small measuring errors, besides a highly accurate measuring of the travel times of ultrasonic waves propagating along the particular measuring path, for example, also an exact as possible knowledge of the transfer behavior, i.e. the transfer function, of each of the ultrasonic transducers, the geometric dimensions of the tube, or pipe, as well as also the velocities of sound relevant for the measuring, and the wave numbers of the total measuring system, are required. Especially, it is, additionally, however, also necessary to assure that the beam angle ($\alpha_F$) actually established during the measuring in the measuring system corresponds as exactly as possible to the nominal beam angle ($\alpha_{F,nom}$) applied for calculating the measured values for the parameters. Thus, an angular deviation ($\Delta\alpha_F$) existing between the nominal beam angle ($\alpha_{F,nom}$) and the actual beam angle ($\alpha_F$) should be as small as possible.

A special problem of measuring systems of the type being discussed lies, for example, in the fact that, such as, for example, also discussed in the above mentioned article in IEEE TRANSACTIONS ON ULTRASONICS, FERROELECTRICS, AND FREQUENCY CONTROL, VOL. 43, NO. 4, July 1996 entitled "Acoustic Transfer Function of the Clamp-On Flowmeter", by Bernhard Funck and Andreas Mitzkus, the tube, or pipe, has naturally a plurality of oscillation modes, in which the tube, or pipe, wall executes, or can execute, Lamb-waves, namely oscillations forming mixed pressure- and shear waves, in such a manner that the tube, or pipe, wall is deflected both in a radial direction as well as also in a longitudinal direction of the tube, or pipe (Lamb wave oscillation modes). These Lamb waves can be both symmetric waves (S0, S1, S2, . . . Sn) as well as also asymmetric waves (A0, A1, A2, . . . An). Most often, several of these Lamb wave oscillation modes can have resonance frequencies, which lie within the bandwidth of the respective ultrasonic transducer, consequently in the vicinity of its center frequency, i.e. within the bandwidth of the excited ultrasonic waves, wherein the actual resonance frequencies of the Lamb wave oscillation modes, or particular positions of their resonance frequencies in the frequency range, are regularly only earlier ascertainable approximately, for instance, based on the above indicated identifying data, i.e. the material parameters of the measuring system. Due to this situation, on the one hand, an exciting of a plurality of Lamb wave oscillation modes is practically unavoidable, on the other hand, it is, however, also not exactly foreseeable, with which intensity various Lamb wave oscillation modes will actually occur during operation. Consequently, it is earlier also not directly determinable, with which intensity and propagation direction the individual spectral fractions of the ultrasonic waves excited by means of the ultrasonic transducers will actually propagate through the lumen. As a result of this, the actually established beam angle can, even in the case of very slight deviations of the structure of a measuring system, namely deviations lying within usual tolerance limits, or very slight deviations of the material properties of the materials involved in the propagation of the ultrasonic waves, deviate from the respective nominal values significantly, namely from the above calculated nominal beam angle to an extent influencing the accuracy of measurement (or, inversely, the measuring errors) significantly, without that this can be detected in normal operation. As other influencing factors, further increasing the uncertainty concerning number and intensity of the actually excited Lamb wave oscillation modes, consequently the uncertainty concerning the deviation of the actual beam angle from the nominal beam angle, can be mentioned, for example, also temperature distribution within the tube, or pipe, wall, within the fluid, and within the ultrasonic transducer, as well as also the actual form of contact surfaces formed between each of the ultrasonic transducers and the tube, or pipe, wall.

In order to minimize the previously indicated disturbing influences of Lamb wave oscillation modes on the accuracy of measurement, in the case of some conventional measuring systems of the type being discussed, not least of all also in the case of conventional clamp-on, ultrasonic, flow measuring devices installed in industrial measurements technology, the driver signal is so generated by means of the operating- and measuring electronics, for example, by correspondingly adapted forming of the above mentioned pulse packets, or bursts, that, as a result, the particular received signal has a maximum signal power or at least achieves a predetermined minimum signal power. The required setting parameters for operating- and measuring electronics are most often ascertained by a corresponding tuning of the measuring system on-site, for instance, by an interactive aligning of the driver signal based on discrete Fourier-transformations (DFT), respectively discrete power spectral density (PSD) ascertained during start-up of the measuring system for the received signal. However, it has been found that, based on the criteria so far applied in conventional measuring systems for optimizing the driver signal, angular deviations ($\Delta\alpha_F$) of essentially less than 0.4°, consequently relative measuring errors of significantly less than 2%, are currently scarcely implementable, or implemented.

SUMMARY OF THE INVENTION

Starting from the above indicated state of the art, an object of the invention is so to improve measuring systems of the type being discussed, not least of all also measuring systems embodied as clamp-on, ultrasonic, flow measuring devices, that angular deviations of less than 0.4°, thus relative measuring errors of less than 2%, especially less than 1.5%, can be achieved; this, especially, also using conventional ultrasonic transducers, especially while maintaining mechanical designs, and principles of construction, previously established in the case of conventional measuring systems.

For achieving the object, the invention resides in a measuring system, for example, a measuring system in the form of a clamp-on, ultrasonic, flow measuring device, for measuring at least one parameter, especially a fluid dynamic parameter, especially a flow velocity and/or a volume flow rate, of a fluid—especially a fluid flowing in a pipeline—, especially a fluid in the form of a liquid, a gas, or a dispersion. The measuring system of the invention comprises:

a tube, or a pipe, having a lumen surrounded by a tube, or pipe, wall, which tube or pipe is adapted to guide a volume portion of the fluid in its lumen, i.e. to be flowed through by the fluid;

a first ultrasonic transducer mounted on the tube, or pipe, on an outside of the tube, or pipe, wall facing away from the lumen, and acoustically coupled via the tube, or pipe, wall to fluid guided in the lumen, and adapted to convert a time varying, especially pulsed, electrical voltage into ultrasonic waves propagating through the tube, or pipe, wall and further through fluid guided in the lumen;

a second ultrasonic transducer mounted on the tube, or pipe, separated from the first ultrasonic transducer on the outside of the tube, or pipe, wall and acoustically coupled via the tube, or pipe, wall to fluid guided in the lumen, for example, a second ultrasonic transducer having an equal construction to that of the first ultrasonic transducer, and adapted to receive ultrasonic waves propagating through fluid guided in the lumen, and further through the tube, or pipe, wall and to transduce such into an electrical voltage varying as a function of time;

as well as an operating- and measuring electronics electrically connected both with the first ultrasonic transducer as well as also with the second ultrasonic transducer, for example, an operating- and measuring electronics in the form of a digital signal processor and/or a microcontroller. The operating- and measuring electronics of the measuring system of the invention is, especially, adapted to generate, at least at times, a driver signal for the first ultrasonic transducer. The driver signal has a time variable, for example, bipolar and/or pulsed, electrical voltage for effecting a received signal of the second ultrasonic transducer likewise having an electrical voltage varying as a function of time and is generated in such a manner, that both the driver signal as well as also the received signal each contain a plurality of spectral signal components equally as well, in each case, a dominating spectral signal component, namely a spectral signal component having, in each case, a maximum power spectral density, and that a frequency of the dominating signal component of the driver signal for the first ultrasonic transducer deviates by a magnitude of no greater than |±100 kHz|, especially by a magnitude of less than |±50 kHz|, from a frequency of the dominating signal component of the received signal of the second ultrasonic transducer and/or by no more than 10%, especially by less than 5%, of the frequency of the dominating signal component of the received signal of the second ultrasonic transducer from such frequency. Furthermore, the operating- and measuring electronics is, additionally, adapted to produce by means of the received signal of the second ultrasonic transducer at least one measured value for the at least one parameter.

Moreover, the invention resides also in the use of such a measuring system of the invention for measuring a flow velocity and/or a volume flow rate and/or a density of a fluid flowing in a pipeline, for example, a fluid in the form of a liquid, a gas, or a dispersion.

In a first embodiment of the invention, it is, furthermore, provided that the first ultrasonic transducer has a 6 dB-bandwidth extending between a downwards located, first limit frequency of said ultrasonic transducer and an upwards located, second limit frequency of said ultrasonic transducer and the second ultrasonic transducer has a 6 dB-bandwidth extending between a downwards located, first limit frequency of said ultrasonic transducer and an upwards located, second limit frequency of said ultrasonic transducer, and that the operating- and measuring electronics is adapted so to generate the driver signal for the first ultrasonic transducer, for example, namely so to set the frequency of the dominating signal component of the driver signal for the first ultrasonic transducer, that the frequency of the dominating signal component of the driver signal for the first ultrasonic transducer deviates from the frequency of the dominating signal component of the received signal by no more than 10%, especially by less than 5%, of a center frequency of the 6 dB-bandwidth of the first ultrasonic transducer, defined as a geometrical average of its first limit frequency and its second limit frequency.

In a second embodiment of the invention, it is, furthermore, provided that the first ultrasonic transducer has a 6 dB-bandwidth extending between a downwards located, first limit frequency of said ultrasonic transducer and an upwards located, second limit frequency of said ultrasonic transducer and the second ultrasonic transducer has a 6 dB-bandwidth extending between a downwards located, first limit frequency of said ultrasonic transducer and an upwards located, second limit frequency of said ultrasonic transducer, and that the operating- and measuring electronics is adapted so to generate the driver signal for the first ultrasonic transducer, for example, namely so to set the frequency of the dominating signal component of the driver signal for the first ultrasonic transducer, that the frequency of the dominating signal component of the driver signal for the first ultrasonic transducer deviates from the frequency of the dominating signal component of the received signal by no more than 10%, especially by less than 5%, of a center frequency of the 6 dB-bandwidth of the second ultrasonic transducer, defined as a geometrical average of its first limit frequency and its second limit frequency.

In a third embodiment of the invention, it is, furthermore, provided that the operating- and measuring electronics is adapted to change the frequency of the dominating signal component of the driver signal for the first ultrasonic transducer, for example, in order to lessen a deviation of such frequency from the dominating signal component of the received signal of the second ultrasonic transducer and/or in such a manner that a, firstly, too large deviation of such frequency from the frequency of the dominating signal component of the received signal of the second ultrasonic transducer is minimized.

In a fourth embodiment of the invention, it is, furthermore, provided that the operating- and measuring electronics is adapted to ascertain an amplitude spectrum of the received signal of the second ultrasonic transducer.

In a fifth embodiment of the invention, it is, furthermore, provided that the operating- and measuring electronics is adapted to ascertain a power and/or an amplitude of the dominating signal component of the received signal of the second ultrasonic transducer, for example, based on an amplitude spectrum of the received signal.

In a sixth embodiment of the invention, it is, furthermore, provided that the operating- and measuring electronics is adapted to ascertain the frequency of the dominating signal component of the received signal of the second ultrasonic transducer, for example, based on an amplitude spectrum of the received signal.

In a seventh embodiment of the invention, it is, furthermore, provided that the operating- and measuring electronics is adapted to modulate the voltage of the driver signal for the first ultrasonic transducer, for example, namely to clock such and/or in such a manner that the voltage is embodied as a sequence of pulse packets having two or more rectangular voltage pulses and/or a sequence of pulse packets following one another with a predetermined time separation.

In an eighth embodiment of the invention, it is, furthermore, provided that the operating- and measuring electronics is adapted so to generate the driver signal for the first ultrasonic transducer that the dominating signal component of the driver signal has, firstly, an initial frequency, namely an initial frequency adjusted to a predetermined start frequency value, for example, one based on earlier ascertained identifying data of the tube, or pipe, and/or one held in a non-volatile data memory of the operating- and measuring electronics, in such a manner that a deviation of the initial frequency of the dominating signal component of the driver signal for the first ultrasonic transducer from the frequency of the dominating signal component of the received signal of the second ultrasonic transducer is greater than an instantaneously achievable minimum deviation and/or in such a manner that a deviation of the frequency of the dominating signal component of the driver signal for the first ultrasonic transducer from the frequency of the dominating signal component of the received signal of the second ultrasonic transducer amounts, firstly, to more than |±100 kHz| and/or more than 10% of the frequency of the dominating signal component of the received signal of the second ultrasonic transducer. Developing this embodiment of the invention further, the operating- and measuring electronics is, additionally, adapted, starting from the initial frequency, at least to change the frequency of the dominating signal component of the driver signal for the first ultrasonic transducer—, for example, namely successively to increase or successively to lessen such —, until the frequency of the dominating signal component of the driver signal for the first ultrasonic transducer deviates from the frequency of the dominating signal component of the received signal of the second ultrasonic transducer by no more than |±100 kHz|, for example, also by less than |±50 kHz|, and/or by no more than 10%, for example, also by less than 5%, of the frequency of the dominating signal component of the received signal of the second ultrasonic transducer from such frequency and/or until a, firstly, too large deviation of the frequency of the dominating signal component of the driver signal for the first ultrasonic transducer from the frequency of the dominating signal component of the received signal of the second ultrasonic transducer is adjusted to an instantaneously achievable, minimum deviation.

In a ninth embodiment of the invention, it is, furthermore, provided that the operating- and measuring electronics is adapted to modulate the electrical voltage of the driver signal for the first ultrasonic transducer in such a manner that the electrical voltage is embodied as a sequence of voltage pulses, for example, voltage pulses in the form of sequential pulse packets with a predetermined time separation and/or rectangular voltage pulses, and it is provided that the operating- and measuring electronics is adapted to change the frequency of the dominating signal component of the driver signal for the first ultrasonic transducer as a function of time, in that voltage pulses generated following one after the other in time have different pulse widths.

In a tenth embodiment of the invention, it is, furthermore, provided that the operating- and measuring electronics is adapted to modulate the voltage of the driver signal for the first ultrasonic transducer in such a manner that the voltage is embodied as a sequence of pulse packets, for example pulse packets having two or more rectangular voltage pulses and/or sequential pulse packets with a predetermined time separation. Developing this embodiment of the invention further, it is additionally provided that the operating- and measuring electronics is adapted to change the frequency of the dominating signal component of the driver signal for the first ultrasonic transducer as a function of time, in that rectangular voltage pulses in the form of a first pulse packet are generated with a pulse width, which deviates from a pulse width, with which pulse packets are subsequently generated as a function of time, for example, generated as rectangular voltage pulses in the form of a second pulse packet.

In an eleventh embodiment of the invention, it is, furthermore, provided that the second ultrasonic transducer is adapted to convert an electrical voltage varying as a function of time into ultrasonic waves propagating through the tube, or pipe, wall and further through fluid guided in the lumen of the tube, or pipe, and that the first ultrasonic transducer is adapted to receive ultrasonic waves propagating through fluid guided in the lumen of the tube, or pipe, and further through the tube, or pipe, wall, and to transduce such into an electrical voltage varying as a function of time.

In a twelfth embodiment of the invention, it is, furthermore, provided that the operating- and measuring electronics is adapted, for effecting a received signal of the first ultrasonic transducer having an electrical voltage varying as a function of time, at least at times, to generate, for example, complementarily to the driver signal for the first ultrasonic transducer, a driver signal for the second ultrasonic transducer having an electrical voltage variable as a function of time, for example, a bipolar and/or pulsed voltage, for example, a driver signal complementary, at least for a predetermined time interval, to the driver signal for the first ultrasonic transducer. Developing this embodiment of the invention further, it is additionally provided that the operating- and measuring electronics is adapted to produce the at least one measured value both by means of the received signal of the second ultrasonic transducer as well as also by means of the received signal of the first ultrasonic transducer, for example, based on a travel-time difference between ultrasonic waves guided along a predetermined measuring path through fluid in the lumen of the tube and propagating in opposing directions, as ascertained based on the received signal of the second ultrasonic transducer and the received signal of the first ultrasonic transducer and/or based on a cross correlation of the received signal of the second ultrasonic transducer and the received signal of the first ultrasonic transducer. Alternatively or supplementally, the operating- and measuring electronics can also be adapted to produce the at least one measured value both by means of the driver signal for the first ultrasonic transducer as well as the received signal of the second ultrasonic transducer as well as also by means of the driver signal for the second ultrasonic transducer as well as the received signal of the first ultrasonic transducer, for example, based on both a travel time for ultrasonic waves propagating through fluid guided in the lumen of the tube along a predetermined measuring path in the direction from the first ultrasonic transducer toward the second ultrasonic transducer ascertained based on the driver signal for the first ultrasonic transducer and the received signal of the second ultrasonic transducer as well as also based on a travel time for ultrasonic waves propagating through fluid guided in the lumen of the tube along the measuring path in the direction from the second ultrasonic transducer toward the first ultrasonic transducer ascertained based on the driver signal for the second ultrasonic transducer and the received signal of the first ultrasonic transducer.

In a thirteenth embodiment of the invention, it is provided that the operating- and measuring electronics is adapted, for effecting a received signal of the first ultrasonic transducer having an electrical voltage varying as a function of time, at least at times, to generate, for example, complementarily to the driver signal for the first ultrasonic transducer, a driver signal for the second ultrasonic transducer having an electrical voltage variable as a function of time, for example, a bipolar and/or pulsed, electrical voltage, for example, an electrical voltage complementary to the driver signal for the first ultrasonic transducer, at least for a predetermined time interval, and it is, furthermore, provided that the operating- and measuring electronics is adapted so to generate the driver signal for the second ultrasonic transducer that both the driver signal as well as also the received signal of the first ultrasonic transducer each contain a plurality of spectral signal components equally as well, in each case, a dominating spectral signal component, namely a spectral signal component having, in each case, maximum power spectral density. Building on this embodiment of the invention further, it is, additionally, provided that the operating- and measuring electronics is adapted to modulate the voltage of the driver signal for the second ultrasonic transducer, for example, to clock it and/or to modulate it in such a manner that the voltage is embodied as a sequence of pulse packets having two or more rectangular voltage pulses and/or following one another with a predetermined time separation. Alternatively or supplementally, the operating- and measuring electronics can, furthermore, be adapted to generate a sequence of pulse packets serviceable as driver signal, $x_B(t)$, for the second ultrasonic transducer (B), for example, pulse packets having two or more rectangular pulses, and/or to change the frequency of the dominating signal component of the driver signal for the second ultrasonic transducer, for example, in order to lessen its deviation from the frequency of the dominating signal component of the received signal of the first ultrasonic transducer, and/or to generate the driver signal for the second ultrasonic transducer complementarily to the driver signal for the first ultrasonic transducer.

In a fourteenth embodiment of the invention, it is provided that the operating- and measuring electronics is adapted, for effecting a received signal of the first ultrasonic transducer having an electrical voltage varying as a function of time, to generate, at least at times, for example, complementarily to the driver signal for the first ultrasonic transducer, a driver signal for the second ultrasonic transducer having an electrical voltage variable as a function of time, for example, a bipolar and/or pulsed, electrical voltage, for example, a driver signal complementary, at least for a predetermined time interval, to the driver signal for the first ultrasonic transducer, and it is, furthermore, provided that the operating- and measuring electronics is adapted so to generate the driver signal for the second ultrasonic transducer that both the driver signal as well as also the received signal of the first ultrasonic transducer contain, in each case, a plurality of spectral signal components equally as well, in each case, a dominating spectral signal component, namely a spectral signal component having, in each case, maximum power spectral density, and that a frequency of the dominating signal component of the driver signal for the second ultrasonic transducer deviates by no more than a magnitude of |±100 kHz|, especially by a magnitude of less than |±50 kHz|, from a frequency of the dominating signal component of the received signal of the first ultrasonic transducer and/or by no more than 10%, especially by less than 5%, of the frequency of the dominating signal component of the received signal of the first ultrasonic transducer from such frequency. Alternatively or supplementally, the operating- and measuring electronics is, additionally, adapted so to generate the driver signal for the first ultrasonic transducer and the driver signal for the second ultrasonic transducer, in each case, that a frequency of the dominating signal component of the driver signal for the second ultrasonic transducer deviates by a magnitude of no more than |±50 kHz|, especially by a magnitude of less than |±10 kHz|, from a frequency of the dominating signal component of the driver signal for the first ultrasonic transducer and/or deviates from such frequency by no more than 1% of the frequency of the dominating signal component of the driver signal for the first ultrasonic transducer.

In a fifteenth embodiment of the invention, it is provided that the operating- and measuring electronics is adapted, for effecting a received signal of the first ultrasonic transducer having an electrical voltage varying as a function of time, to generate, at least at times, for example, complementarily to the driver signal for the first ultrasonic transducer, a driver signal for the second ultrasonic transducer having an electrical voltage variable as a function of time, for example, a bipolar and/or pulsed, electrical voltage, for example, a driver signal complementary, at least for a predetermined time interval, to the driver signal for the first ultrasonic transducer, and it is, furthermore, provided that the operating- and measuring electronics is adapted so to generate the driver signal for the second ultrasonic transducer that both the driver signal as well as also the received signal of the first ultrasonic transducer contain, in each case, a plurality of spectral signal components and, equally as well, in each case, a dominating spectral signal component, namely one having, in each case, maximum power spectral density, as well as to convert the received signal of the first ultrasonic transducer into a digital received signal representing the received signal, and to produce the at least one measured value for the at least one parameter by means of the digital received signal representing the received signal of the first ultrasonic transducer. Developing this embodiment of the invention further, it is additionally provided that the operating- and measuring electronics is adapted to generate a discrete Fourier transformation (DFT) of the digital received signal representing the received signal of the first ultrasonic transducer, as well as to ascertain the frequency of the dominating signal component of the received signal of the first ultrasonic transducer based on the Fourier transformation.

In a sixteenth embodiment of the invention, it is, furthermore, provided that the operating- and measuring electronics is adapted to convert the received signal of the second ultrasonic transducer into a digital received signal representing the received signal, as well as to produce the at least one measured value for the at least one parameter by means of the digital received signal representing the received signal of the second ultrasonic transducer. Building on this embodiment of the invention further, it is, additionally, provided that the operating- and measuring electronics is adapted to generate a discrete Fourier transformation (DFT) of the digital received signal representing the received signal of the second ultrasonic transducer, as well as to ascertain the frequency and/or an amplitude and/or a power of the dominating signal component of the received signal of the second ultrasonic transducer based on the discrete Fourier transformation.

In a seventeenth embodiment of the invention, it is, furthermore, provided that the tube, or pipe, has Lamb wave oscillation modes, in which the tube, or pipe, wall executes, or can execute, oscillations forming Lamb waves, and that the operating- and measuring electronics is adapted so to generate the driver signal for the first ultrasonic transducer that the frequency of the dominating signal component of the driver signal deviates from a resonant frequency of one of the Lamb wave oscillation modes by a magnitude of less than |±100 kHz|, especially by a magnitude of less than |±50 kHz|, and/or from such resonant frequency by less than 10%, especially by less than 5%, of a resonant frequency of one of the Lamb wave oscillation modes. Building on this embodiment of the invention further, it is, additionally, provided that a center frequency of a 6 dB-bandwidth of the first ultrasonic transducer deviates from the resonant frequency of the Lamb wave mode of oscillation by more than 5% of such resonant frequency, and/or that a center frequency of a 6 dB-bandwidth of the second ultrasonic transducer deviates from the resonant frequency of such Lamb wave mode of oscillation by more than 5% of such resonant frequency.

In an eighteenth embodiment of the invention, it is, furthermore, provided that the tube, or pipe, wall has a wall thickness, which is greater than 2 mm, for example, greater than 5 mm.

In a nineteen embodiment of the invention, it is, furthermore, provided that the tube, or pipe, wall has a wall thickness, which is less than 10 mm.

In a twentieth embodiment of the invention, it is, furthermore, provided that the tube, or pipe, wall is composed of a metal, for example, a steel.

In a twenty first embodiment of the invention, it is, furthermore, provided that the tube, or pipe, is embodied as a pipe forming an integral component of a pipeline.

In a twenty second embodiment of the invention, it is, furthermore, provided that the tube, or pipe, is a tube inserted into the course of a pipeline, for example, in such a manner that the tube is connected with a first segment of the pipeline by means of a first flange connection and with a second segment of the pipeline by means of a second flange connection.

In a twenty third embodiment of the invention, it is, furthermore, provided that the first ultrasonic transducer is formed by means of a piezoelectric transducer element, for example, manufactured of lead-zirconate-titanate and/or another piezo-ceramic, as well as by means of a coupling body sound conductingly coupled with the transducer element and manufactured, for example, of polyetherimide (PEI).

In a twenty fourth embodiment of the invention, it is, furthermore, provided that the second ultrasonic transducer is formed by means of a piezoelectric transducer element, for example, manufactured of lead-zirconate-titanate and/or another piezo-ceramic, as well as by means of a coupling body sound conductingly coupled with the transducer element and manufactured, for example, of polyetherimide (PEI).

In a twenty fifth embodiment of the invention, it is, furthermore, provided that the operating- and measuring electronics has a data memory for storing digital data, especially a non-volatile data memory, for example, for storing at least one parameter value for at least one setting parameter characterizing the driver signal for the first ultrasonic transducer. Developing this embodiment of the invention further, it is additionally provided that the operating- and measuring electronics is adapted to store parameter values for at least one setting parameter characterizing the driver signal for the first ultrasonic transducer recurringly in such data memory, for example, in each case, together with a time value representing a point in time of a setting, or a storing, of a parameter value. Alternatively or supplementally, the operating- and measuring electronics can, furthermore, be adapted by applying parameter values stored in the data memory for the at least one setting parameter characterizing the driver signal for the first ultrasonic transducer to perform a checking of an ability of the measuring system to function, for example, namely a checking of an ability of the first ultrasonic transducer and/or the second ultrasonic transducer to function, and/or a checking of an integrity of the tube, and/or with application of at least one parameter value stored in the data memory for the at least one setting parameter characterizing the driver signal for the first ultrasonic transducer to detect a degradation of the tube, or pipe, for example, a change of a wall thickness of the tube, or pipe, wall, and/or a change of a transfer function of at least one of the two ultrasonic transducers.

In a twenty sixth embodiment of the invention, it is, furthermore, provided that the first ultrasonic transducer is adapted to be operated intermittently as a transmitter converting electrical power into sound power, or as a receiver transducing sound power into electrical power.

In a twenty seventh embodiment of the invention, it is, furthermore, provided that the second ultrasonic transducer is adapted to be operated intermittently, especially complementarily to the first ultrasonic transducer, as a receiver transducing sound power into electrical power, or as a transmitter converting electrical power into sound power.

In a twenty eighth embodiment of the invention, it is, furthermore, provided that the operating- and measuring electronics is adapted to produce the at least one measured value both by means of the received signal of the second ultrasonic transducer as well as also by means of the driver signal for the first ultrasonic transducer, for example, based on a travel time ascertained based on the driver signal for the first ultrasonic transducer and the received signal of the second ultrasonic transducer for ultrasonic waves propagating through fluid guided in the lumen of the tube along a predetermined measuring path in the direction from the first ultrasonic transducer to the second ultrasonic transducer.

A basic idea of the invention is to improve the accuracy of measurement of measuring systems of the type being discussed by selectively implementing a significant exciting of exactly one dominant Lamb wave oscillatory mode of the tube, or pipe, lying within a frequency range fixed by a bandwidth of the driver signal used in normal measuring operation for the ultrasonic transducer, as well as also by a bandwidth of the ultrasonic transducer, in such a manner that a high fraction of sound power generated by means of the ultrasonic transducer operated as transmitter is transformed into oscillations of the dominant Lamb wave oscillatory mode, and a significant exciting of other Lamb wave oscillatory modes of the tube, or pipe, is prevented. The invention rests, for example, on the surprising recognition that this can be reproduced, with a repetition accuracy sufficient for the desired high accuracy of measurement, by the above described, comparatively simply implemented, consequently very robust adjustment of the respective driver signal relative to the received signal effected therewith, even at typically very less accurate knowledge of the actual resonant frequency of the dominant Lamb wave oscillatory mode, so that, as a result, the accuracy of measurement can be clearly increased compared with the measurement accuracies so far achieved with conventional measuring systems of the type being discussed, for instance, using the above mentioned method directed toward maximizing the signal power of the received signal. A further advantage of the invention is not least of all also therein to be seen that this can be implemented very simply also in already established (hardware) architectures of measuring systems of the type being discussed just by corresponding modifications of the operating- and measuring electronics, for example, by reprogramming the same, e.g. by loading a correspondingly adapted firmware into the operating- and measuring electronics.

BRIEF DESCRIPTION OF THE DRAWINGS

The invention as well as advantageous embodiments thereof will now be explained in greater detail based on examples of embodiments shown in the figures of the drawing. Equal, especially equally acting or equally functioning, parts are provided in all figures with equal reference characters; when perspicuity requires or it otherwise appears sensible, already mentioned reference characters are omitted in subsequent figures. Other advantageous embodiments or further developments, especially also combinations, firstly, of only individually explained aspects of the invention, will become evident, furthermore, from the figures of the drawing and/or from claims per se.

The figures of the drawing show as follows:

FIGS. 1a, and 1b two measuring systems formed in each case by means of two ultrasonic transducers arranged outwardly on a tube or pipe in a pipeline, in order to measure at least one parameter of a fluid flowing in the pipeline;

FIG. 3a a graph as a function of time for an electrical voltage of an additional variant of a driver signal suitable for a measuring system of FIG. 1a or 1b for one of the ultrasonic transducers of the measuring system, normalized to a maximum value of the voltage;

FIG. 3b in log representation (base-10 logarithm), magnitude of a frequency spectrum for level of an electrical voltage as a function of time per FIG. 3a, referenced to a maximum magnitude of the frequency spectrum, in dB;

FIG. 6a dependence of a measurement error of a measuring system of FIG. 1a, or 1b, on frequency of a dominating signal component of a driver signal having voltage as a function of time as in FIG. 2a, or 3a.

DETAILED DISCUSSION IN CONJUNCTION WITH THE DRAWINGS

Figures 2A, 2B:
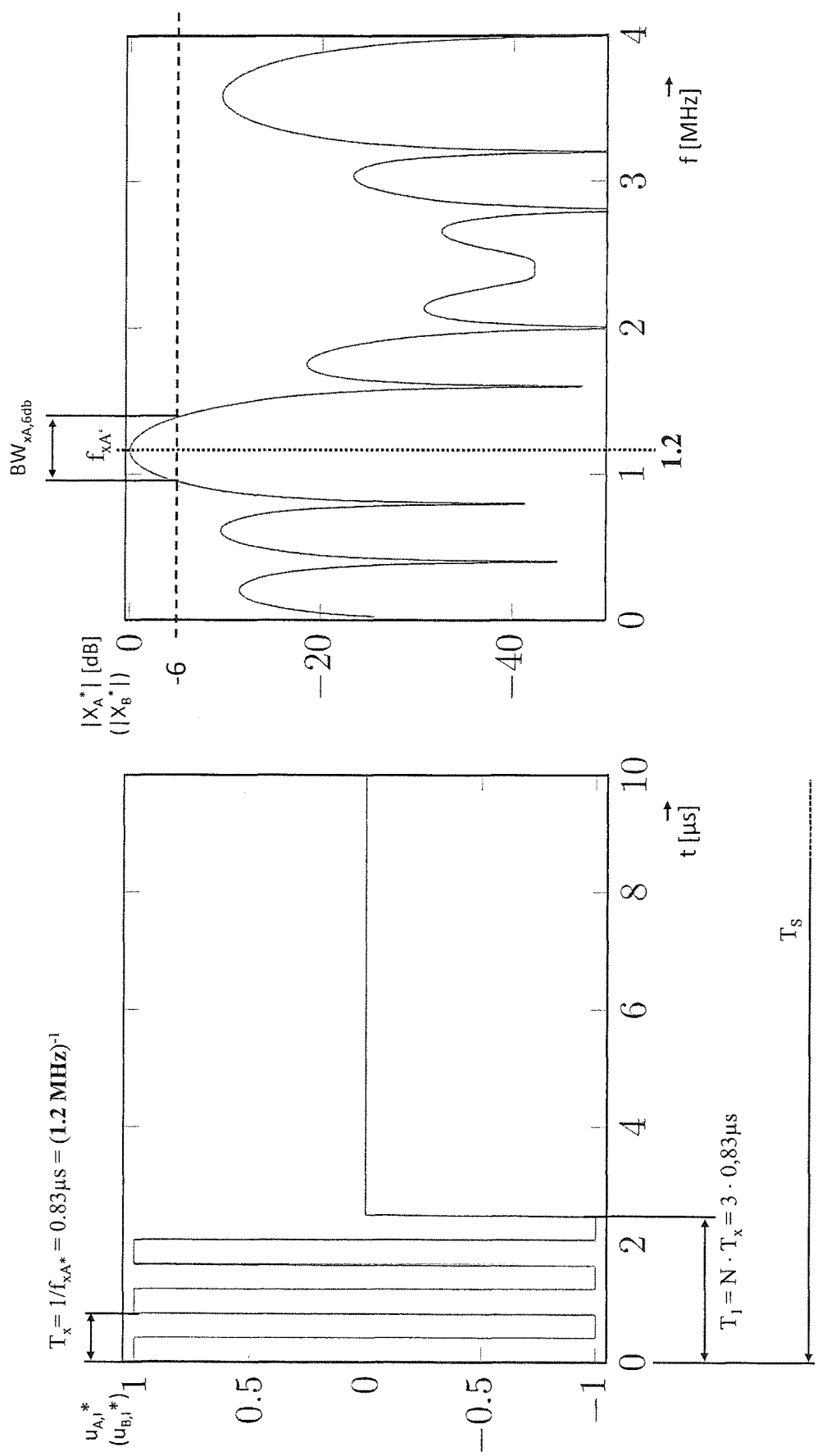
FIG. 2a a graph as a function of time for an electrical voltage of a driver signal suitable for a measuring system of FIG. 1a or 1b for one of the ultrasonic transducers of the measuring system, normalized to a maximum value of the voltage.
FIG. 2b in log representation (base-10 logarithm), magnitude of a frequency spectrum for level of an electrical voltage as a function of time per FIG. 2a, referenced to a maximum magnitude of the frequency spectrum (normalized, one-sided, amplitude spectrum of the voltage), in dB (decibel)

FIGS. 1a and 1b show, schematically, an example of an embodiment of a measuring system for measuring at least one parameter, especially a fluid dynamic parameter, for example, a flow velocity $V_0$, a volume flow rate $Q_V$ or some other flow parameter, of a fluid FL flowing in a pipeline, for example, a fluid in the form of a liquid, a gas, or a dispersion. The pipeline can be embodied, for example, as a plant component of a water distribution or a water collection network, consequently the fluid can be, for example, drinking water or waste water. The fluid FL can, however, for example, also be petroleum or a liquid fuel. The pipeline can, for example, also be a component of a petrochemical plant.

The measuring system includes a tube, or pipe, 10 having a lumen 10' surrounded by a tube, or pipe, wall 10a. Tube, or pipe, 10 is adapted to guide a volume portion of the fluid FL in its lumen, i.e. to be flowed through by the fluid FL. Tube, or pipe, 10 can be embodied, for example, as a discrete tube, which is inserted into the course of a pipeline, for example, in that the tube 10, such as indicated in FIG. 1a, is connected with a first segment of the pipeline by means of a first flange connection 11 and with a second segment of the pipeline by means of a second flange connection 12. The tube, or pipe, 10 can, however, for example, also be embodied as a subsection of such a pipeline, for example, thus, an already existing pipeline, and, consequently, be a pipe forming an integral component of the pipeline. A wall thickness of the tube, or pipe, wall can lie, for example, in the range from a few millimeters up to several centimeters. In an embodiment of the invention, it is, especially, provided that the tube, or pipe, wall has a wall thickness, which is greater than 2 mm, especially also greater than 5 mm. In an additional embodiment of the invention, the tube, or pipe, wall is composed of a metal, for example, a steel.

Besides the tube, or pipe, 10, the measuring system includes, furthermore, a first ultrasonic transducer A mounted on the tube, or pipe, 10 on an outside of the tube, or pipe, wall 10a facing away from the lumen 10' and acoustically coupled via the tube, or pipe, wall to fluid guided in the lumen 10', a second ultrasonic transducer B mounted on the tube, or pipe, separated from the ultrasonic transducer A on the outside of the tube, or pipe, wall and acoustically coupled via the tube, or pipe, wall to fluid guided in the lumen 10', as well as an operating- and measuring electronics 2, which is electrically connected both with the first ultrasonic transducer as well as also with the second ultrasonic transducer. The measuring system can, accordingly, be, for example, a clamp-on, ultrasonic, flow measuring device. The operating- and measuring electronics 2 can be formed, for example, by means of a digital signal processor and/or a microcontroller. Additionally, operating- and measuring electronics 2 can be accommodated, for example, in a pressure- and/or shock resistant, protective housing H, for example, in a protective housing of a metal, such as, for instance, a stainless steel or aluminum, or a plastic.

In an additional embodiment of the invention, it is provided that the operating- and measuring electronics 2 has a data memory MEM, for example, a non-volatile, data memory MEM, for storing digital data. Digital data to be stored in the data memory MEM can be, for example, data generated during operation of the measuring system, such as, for instance, measurement data and/or parameter values of setting parameters for operating- and measuring electronics 2. Particularly for a later diagnosis of the measuring system, it can be of advantage at least to store the parameter values together with time values representing points in time of setting, or storing, the particular parameter values.

Each of the two ultrasonic transducers A, B, for example, equally-constructed, ultrasonic transducer A, B, can, such as quite usual in the case of measuring systems of the type being discussed, be formed, in each case, by means of a piezoelectric transducer element as well as a coupling body sound conductingly coupled with the transducer element. In an additional embodiment of the invention, it is, furthermore, provided that at least one of the two ultrasonic transducers A, B, for example, also each of the two ultrasonic transducers, is formed by means of a piezoelectric transducer element of lead-zirconate-titanate and/or another piezo-ceramic as well as by means of a coupling body of polyetherimide (PEI).

As indicated in FIG. 1a, the ultrasonic transducer A is, especially, adapted to convert an electrical voltage $u_{A,I}$ varying as a function of time, for example, namely a pulsed electrical voltage $u_{A,I}$, into ultrasonic waves $W_{AB,I}$ propagating through the tube wall 10a and further through fluid guided in the lumen 10' of the tube 10, and, consequently, to be operated as a transmitter converting electrical power into sound power. Additionally, the ultrasonic transducer B, for example, one having the same construction as ultrasonic transducer A, is adapted to receive ultrasonic waves $W_{AB,II}$ propagating through fluid guided in the lumen of the tube, and further through the tube wall, and to transduce such into an electrical voltage $u_{B,II}$ varying as a function of time, and, consequently, to be operated as a receiver transducing sound power into electrical power.

The ultrasonic transducer A has a 6 dB-bandwidth $BW_{A,6\ dB}$ extending between a downwards located, first limit frequency $f_{d,A}$ of the ultrasonic transducer A and an upwards located, second limit frequency $f_{u,A}$ of the ultrasonic transducer A; equally, the ultrasonic transducer B has a 6 dB-bandwidth $BW_{B,6\ dB}$ extending between a downwards located, first limit frequency $f_{d,B}$ of said ultrasonic transducer B and an upwards located, second limit frequency $f_{u,B}$ of said ultrasonic transducer B. A center frequency $f_{0,A}$ of the 6 dB-bandwidth $BW_{A,6\ dB}$ of the ultrasonic transducer A, defined as a geometrical average $(f_{d,A} \cdot f_{u,A})^{1/2}$ of its first limit frequency, $f_{d,A}$, and its second limit frequency, $f_{u,A}$, as well as also a center frequency $f_{0,B}$ of the 6 dB-bandwidth $BW_{B,6\ dB}$ of the ultrasonic transducer B, defined as a geometrical average $(f_{d,B} \cdot f_{u,B})^{1/2}$ of its first limit frequency, $f_{d,B}$, and its second limit frequency, $f_{u,B}$, can, for example, in each case, lie in a range of 0.5-6 MHz. Furthermore, the 6 dB-bandwidth of each of the ultrasonic transducers can, for example, be so selected, that it—such as quite usual in the case of measuring systems of the type being discussed— amounts to, for instance, 20-30% of the particular center frequency $f_{0,A}$ or $f_{0,B}$, e.g. corresponds to a frequency range lying between, for instance, 0.2 MHz to, for instance, 2.5 MHz.

The two ultrasonic transducers A, B are, such as schematically shown in FIG. 1a, so mutually spaced and so oriented on the outside of the tube wall 10a that the ultrasonic waves $W_{AB,I}$ brought about by means of the ultrasonic transducer A propagate within the fluid located in the lumen partially along a sound propagation path useful as measuring path AB and thereafter acoustically couple at least partially via the tube wall into the ultrasonic transducer B as ultrasonic waves ($W_{AB,II}$). Especially, the two ultrasonic transducers A, B are, in such case, so positioned and oriented on the outside of the tube wall that, as also indicated in FIG. 1a, the sound propagation path serviceable as measuring path has a main propagation direction inclined relative to an inner diameter D of the tube by an actual beam angle $\alpha_F$, in such a manner that a length L of the measuring path corresponding to a path length of the sound propagation path corresponds to a quotient $D/\cos \alpha_F$ of the mentioned inner diameter D divided by the cosine of the beam angle $\alpha_F$.

Figures 4A, 4B:
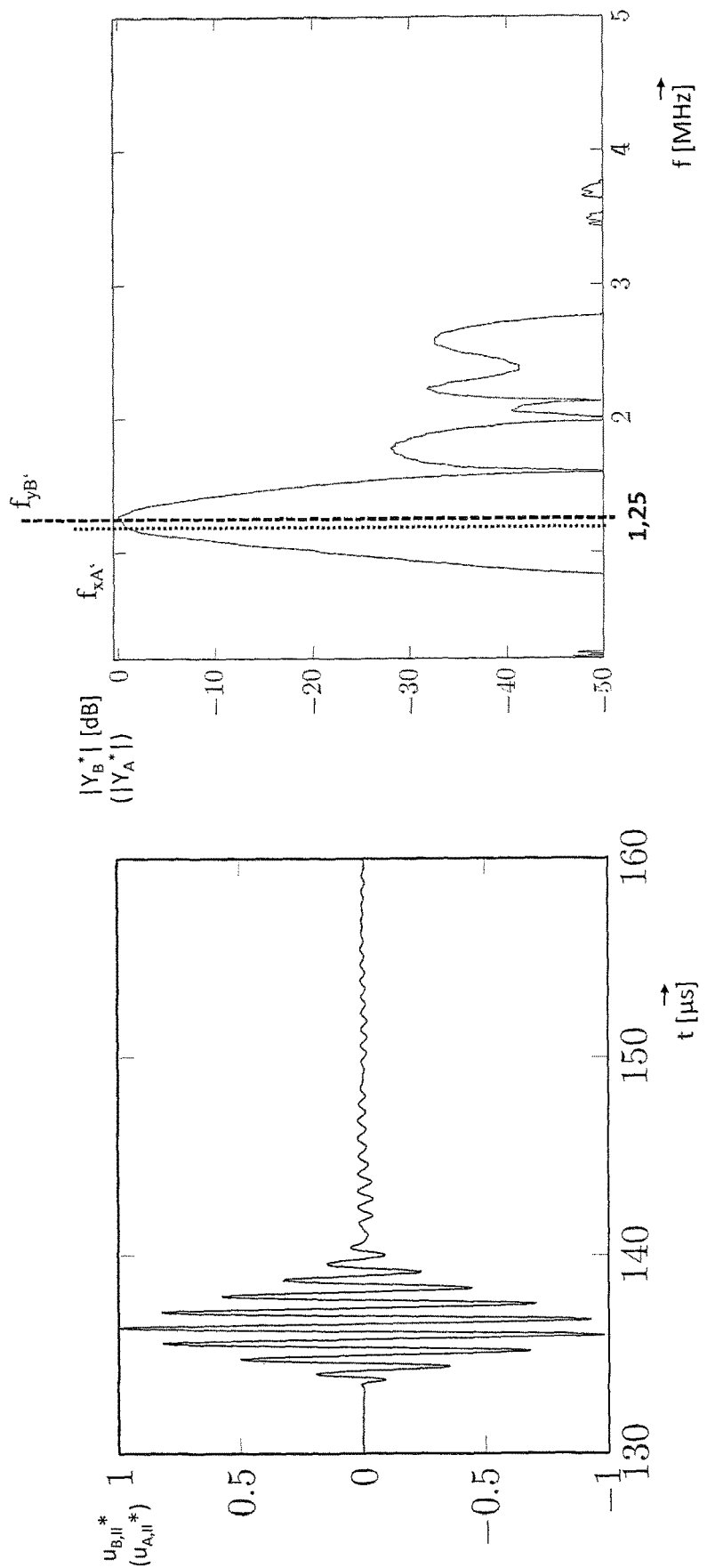
FIG. 4a a graph as a function of time for an electrical voltage of a received signal delivered in a measuring system of FIG. 1a or 1b by an ultrasonic transducer of the measuring system, normalized to a maximum value of the voltage.
FIG. 4b in log representation (base-10 logarithm), magnitude of a frequency spectrum for level of an electrical voltage as a function of time per FIG. 4a, referenced to a maximum magnitude of the frequency spectrum, in dB.
Figure 5:
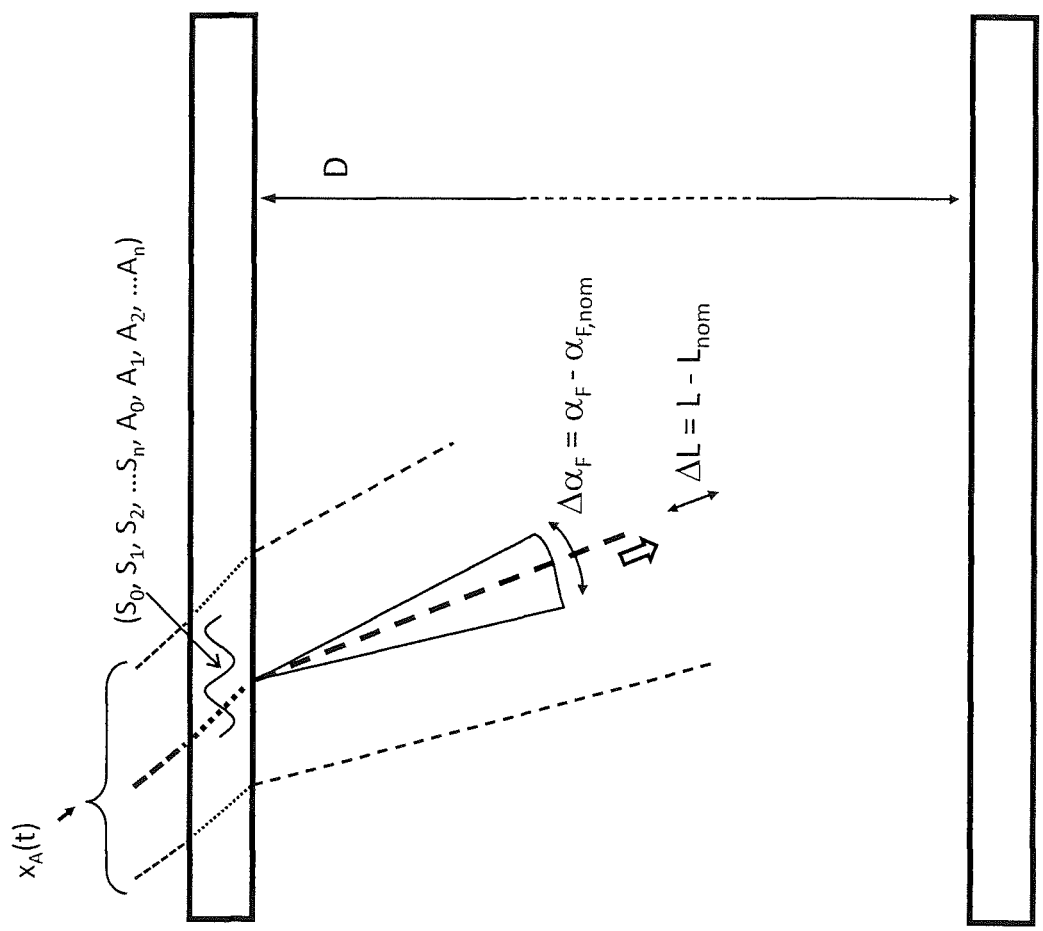
FIG. 5 schematically, the course of a sound propagation path formed in a measuring system of FIG. 1a for 1 b and used as measuring path.

The operating- and measuring electronics 2 is, in turn, correspondingly also adapted for effecting a received signal $y_B(t)$ of the ultrasonic transducer B having an electrical voltage varying as a function of time $u_{B,II}$, i.e. for effecting an electrical voltage $u_{B,II}$ varying on the second ultrasonic transducer as a function of time and useful as received signal $y_B(t)$, at least at times to generate a driver signal $x_A(t)$, for the ultrasonic transducer A having an electrical voltage $u_{A,I}$ variable as a function of time, especially a bipolar and/or pulsed, electrical voltage $u_{A,P}$, i.e. to apply to the ultrasonic transducer A an electrical voltage serviceable as driver signal $x_A(t)$ for the ultrasonic transducer A and variable as a function of time, for example, namely a bipolar and/or pulsed, electrical voltage. The driver signal $x_A(t)$ provided by means of the operating- and measuring electronics 2 is in the case of the measuring system of the invention so embodied that both the driver signal $x_A(t)$, i.e. its electrical voltage $u_{A,I}$—as well as also shown in FIGS. 2a and 3a, in each case, based on a voltage $u_{A,I}^*$ of the driver signal normalized based on a maximum level, and in FIGS. 2b and 3b, in each case, based on an amplitude spectrum $|X_A^*|$ of the voltage $u_{A,I}$ normalized based on a maximum magnitude, and directly evident from a combination FIGS. 2a, 2b, 3a and 3b—as well as also the received signal $y_B(t)$, i.e. its electrical voltage $u_{B,II}$, effected therewith—as well as also shown in FIG. 4a based on a voltage $u_{A,I}^*$ of the received signal normalized based on a maximum level and in FIG. 4b based on an amplitude spectrum $|Y_B^*|$ of the voltage $u_{B,II}$ normalized based on a maximum magnitude, and directly evident from a combination of FIGS. 4a and 4b—, each contain a plurality of spectral signal components $x_{A,i}$, and $y_{B,i}$, respectively, wherein both the driver signal $x_A(t)$ as well as also the received signal $y_B(t)$ each contain a dominating spectral signal component $x_A'$, and $y_B'$, namely one having, in each case, a maximum power spectral density $S_{xxA,MAX}$ and $S_{yyB,MAX}$. A frequency spectrum of the driver signal $x_A(t)$, not least of all also a frequency $f_{xA'}$ of its dominating spectral signal component $x_A'$, can correspondingly be matched to the bandwidths of the ultrasonic transducers A, B as well as to their center frequencies $f_{0,A}$, respectively $f_{0,B}$, for instance, in such a manner that the dominating spectral signal component $x_A'$ and, associated therewith, the dominating spectral signal component $y_B'$ lie within the 6 db-bandwidths of the ultrasonic transducers A, B, and that a 6 db-bandwidth $BW_{xA,6dB}$ of the driver signal $x_A(t)$, i.e. of its electrical voltage $u_{A,P}$ amounts to, for example, more than 100 kHz, especially more than 1 MHz. Moreover, the driver signal $x_A(t)$ can, in advantageous manner, furthermore, be so embodied that the driver signal $x_A(t)$ contains, besides a main frequency band containing the spectral signal component $x_A'$ and corresponding to the above-mentioned 6 db-bandwidth $BW_{xA,6dB}$, and consequently containing the dominating spectral signal component $x_A$, at most, such side frequency bands, whose particular spectral signal components have all, compared with the power spectral density $S_{xxA,MAX}$ of the dominating spectral signal component $x_A'$, a power spectral density smaller by not less than 6 dB (decibel), i.e. their particular spectral signal components, as well as also shown by way of example in FIGS. 2b and 3b, have all, compared with a (voltage-) level of the dominating spectral signal component $x_A'$ a (voltage-) level smaller by not less than 6 dB.

In an additional embodiment of the invention, the operating- and measuring electronics 2, is, especially, adapted to modulate the voltage $u_{A,I}$ of the driver signal $x_A(t)$ for the ultrasonic transducer A, for example, namely to clock such; this, especially, in such a manner that the voltage $u_{A,I}$ is embodied as a sequence of pulse packets sequentially generated with a shot rate 1/Ts, especially a predetermined shot rate and/or at least a shot rate held constant for a predetermined time interval ($\gg 2 \cdot Ts$). Each sequence of pulse packets can have a predetermined number N of rectangular voltage pulses, for example, namely, in each case, two or more, rectangular voltage pulses. As shown, by way of example, in FIG. 2a, a pulse packet can be formed, for example, by means of 3 (N=3) equally large, bipolar, rectangular pulses, consequently having, in each case, one and the same period length $T_x$ ($T_x=0.87$ μs). The pulse packets can, furthermore, be so embodied that pulse packets following one after the other in time have, in each case, an equal number N of rectangular pulses, especially uniform, rectangular pulses, and are uniform at least for a predetermined time interval ($\gg 2 \cdot T_S$), consequently have also, in each case, an equal packet length $T_i$ ($T_i=N \cdot T_x$). Alternatively or supplementally to the above-mentioned voltage $u_{A,P}$, namely one embodied as a sequence of rectangular voltage pulses formed to pulse packets with a clock signal $T_S$ corresponding to the shot rate, the driver signal $x_A(t)$ can, as well as also shown in FIG. 3a, at least at times, however, also have a voltage, which is embodied as a sequence of sinusoidal voltage pulses (bursts) formed with the clock signal corresponding to the shot rate to pulse packets, for example, also uniform, pulse packets.

The operating- and measuring electronics 2 of the measuring system of the invention is, furthermore, also adapted by means of the received signal $y_B(t)$ of the ultrasonic transducer B to produce at least one measured value $X_M$, or a number of such measured values, for the at least one parameter, for example, the flow velocity $V_0$, or the volume flow rate $Q_V$. The at least one measured value $X_M$, or the measured values, can, for example, be visualized on-site and/or transmitted—by wire via connected fieldbus and/or wirelessly per radio—to an electronic data processing system, for instance, a programmable logic controller (PLC) and/or a process control station, for example, namely via fieldbus, for instance, according to IEC 61158, IEC 61784-1, and/or IEC 61784-2, and/or via radio connection, for instance, according to IEEE 802.11 or IEEE 802.15.4. In an additional embodiment of the invention, the operating- and measuring electronics 2 is adapted to produce the at least one measured value $X_M$ both by means of the received signal $y_B(t)$ of the ultrasonic transducer B as well as also by means of the driver signal $x_A(t)$ for the ultrasonic transducer A, for example, namely based on a travel time $t_{AB}$ (ascertained based on the driver signal $x_A(t)$ and the received signal $y_B(t)$) for ultrasonic waves $W_{AB,II}$ propagating through fluid guided in the lumen of the tube along the predetermined measuring path AB in the direction from the ultrasonic transducer A to the ultrasonic transducer B. In another embodiment of the invention, the ultrasonic transducer A is, additionally, adapted to be operated not only as a transmitter converting electrical power into sound power, but, instead, as well as also shown in FIG. 1b, or directly evident from a combination of FIGS. 1a and 1b, intermittently as a transmitter converting electrical power into sound power, and as a receiver transducing sound power into electrical power. Moreover, the ultrasonic transducer B can also be adapted intermittently, for example, namely also complementarily to the ultrasonic transducer A, to be operated as a receiver transducing sound power into electrical power, or as a transmitter converting electrical power into sound power. Accordingly, in an additional embodiment, the ultrasonic transducer B is also adapted to convert an electrical voltage varying as a function of time into ultrasonic waves propagating through the tube wall and further through fluid guided in the lumen of the tube, and the ultrasonic transducer A is adapted to receive ultrasonic waves propagating through fluid guided in the lumen of the tube and further through the tube wall and to transduce such into an electrical voltage varying as a function of time. Furthermore, the operating- and measuring electronics 2 is, according to an additional embodiment of the invention, also adapted, for effecting an electrical voltage varying as a function of time in the ultrasonic transducer A, useful as a received signal $y_A(t)$ of the ultrasonic transducer A and having, for example, likewise a bandwidth of more than 100 kHz, to generate, at least at times, especially alternately to the driver signal $x_A(t)$ for the ultrasonic transducer A, also a driver signal $x_B(t)$ for the ultrasonic transducer B, having an electrical voltage variable as a function of time, especially a bipolar, electrical voltage. The driver signal $x_B(t)$ can, for example, be so embodied that it is, at least for a predetermined time interval, complementary to the driver signal $x_A(t)$ for the ultrasonic transducer A. The operating- and measuring electronics 2 can, in such case, additionally be adapted to produce the at least one measured value both by means of the received signal $y_B(t)$ of the ultrasonic transducer B as well as also by means of the received signal $y_A(t)$ of the ultrasonic transducer A, for example, based on a travel-time difference, ascertained based on the received signals $y_B(t)$, $y_A(t)$, between ultrasonic waves propagating through fluid guided in the lumen of the tube along a predetermined measuring path, equally as well in opposing direction and/or based on a cross correlation of the received signals $y_B(t)$, $y_A(t)$. In supplementation thereto, the operating- and measuring electronics 2 can, furthermore, also be adapted to produce the at least one measured value both by means of the driver signal $x_A(t)$ for the ultrasonic transducer A as well as the received signal $y_B(t)$ of the ultrasonic transducer B as well as also by means of the driver signal $x_B(t)$ for the ultrasonic transducer B as well as the received signal $y_A(t)$ of the ultrasonic transducer A, for example, based on both a travel time $t_{AB}$ ascertained based on the driver signal $x_A(t)$ and the received signal $y_B(t)$ for ultrasonic waves $W_{AB,H}$ propagating through fluid guided in the lumen of the tube along the measuring path AB in the direction from the ultrasonic transducer A toward the ultrasonic transducer B as well as also based on a travel time $t_{BA}$ ascertained based on the driver signal $x_B(t)$ and the received signal $y_A(t)$ for ultrasonic waves $W_{BA,H}$ propagating through fluid guided in the lumen of the tube along a measuring path directed counter to the measuring path AB in the direction from the ultrasonic transducer B toward the ultrasonic transducer A. Based on the ascertained travel times $t_{AB}$, $t_{BA}$, and the corresponding travel-time difference $(t_{BA}-t_{AB})$, the fluid dynamic parameter, average flow velocity $V_0$, can be calculated by means of the operating- and measuring electronics, for example, namely based on the formula:

$$V_0 = \frac{L}{2 \cdot \sin\alpha_F} \cdot \frac{t_{ba}-t_{ab}}{t_{ab} \cdot t_{ba}} = \frac{1}{2 \cdot \sin\alpha_F} \cdot \frac{D}{\cos\alpha_F} \cdot \frac{t_{ba}-t_{ab}}{t_{ab} \cdot t_{ba}},$$

and/or the fluid dynamic parameter, volume flow rate $Q_V$, can be calculated by means of the operating- and measuring electronics, for example, namely based on the formula:

$$Q_V = \frac{\pi}{4} \cdot K \cdot D^2 \cdot V_0 = \frac{\pi}{4} \cdot K \cdot D^2 \cdot \frac{L}{2 \cdot \sin\alpha_F} \cdot \frac{t_{ba}-t_{ab}}{t_{ab} \cdot t_{ba}}.$$

The beam angle $\alpha_F$ and correspondingly also the path length L are dependent, for example, on the orientation of the ultrasonic transducers A, B relative to the pipe 10 as well as on the velocities of sound and acoustic impedances of the measuring system established in the measuring system and relevant for the sound propagation. With knowledge of the actual structure of the measuring system, not least of all also the wall thickness of the pipe wall and the inner diameter D of the pipe, and the velocities of sound $(c_i)$ and wave numbers $(k_i)$ of the used materials, including the fluid FL guided in the lumen of the pipe, the beam angle $\alpha_F$ can be earlier calculated as a nominal beam angle $\alpha_{F,nom}$ $(\alpha_{F,nom} \rightarrow \alpha_F)$, for example, based on Snell's law of refraction for acoustics. Furthermore, with knowledge of the beam angle $\alpha_{F,nom}$ as well as the inner diameter D, also the path length L can be correspondingly earlier calculated as the nominal path length $(L_{nom}=D/\cos \alpha_{F,nom} \rightarrow L)$. The ascertaining of these nominal values can occur, for example, in the course of a start-up of the measuring system during the tuning of the mounted measuring system by means of the operating- and measuring electronics. Alternatively or supplementally to the above-mentioned fluid dynamic parameters, also, for example, the velocity of sound characterizing the material of the fluid can be ascertained by means of the operating- and measuring electronics 2, for example, based on the formula:

$$c_{FL} = \frac{L}{2} \cdot \left( \frac{1}{t_{ab}} + \frac{1}{t_{ba}} \right).$$

Particularly also for the purpose of ascertaining the at least one measured value $X_M$, the operating- and measuring electronics 2 is, according to an additional embodiment of the invention, additionally, adapted to convert the received signal $y_B(t)$ of the ultrasonic transducer B into a digital received signal $y_{Bd}$ representing the received signal $y_B(t)$ as well as to produce the at least one measured value for the at least one parameter by means of the digital received signal $y_{Bd}$. For the previously indicated case, in which the two ultrasonic transducers A, B can, in each case, be operated intermittently as a transmitter converting electrical power into sound power, and as a receiver transducing sound power into electrical power, the operating- and measuring electronics can, furthermore, also be adapted to convert the received signal $y_A(t)$ of the ultrasonic transducer A into a digital received signal $y_{Ad}$ representing the received signal $y_A(t)$ as well as correspondingly to produce the at least one measured value for the at least one parameter by means of the digital received signal $y_{Ad}$, for example, namely to produce the at least one measured value for the at least one parameter by means of the digital received signal $y_{Ad}$ as well as by means of the digital received signal $y_{Bd}$.

As already mentioned above, the pipe has naturally a plurality of so-called Lamb wave oscillation modes, namely a plurality of asymmetric Lamb wave oscillation modes $A_0$, $A_1$, $A_2$ ... $A_n$, and a plurality of symmetric Lamb wave oscillation modes $S_0$, $S_1$, $S_2$ ... $S_n$, in which the pipe wall executes, or can execute, oscillations forming Lamb waves, in such a manner that a number of the Lamb wave oscillation modes have, in each case, resonance frequencies, which lie within the bandwidth of the two ultrasonic transducers A, B, of the driver signal $x_A(t)$ or of the driver signal $x_B(t)$, consequently within the bandwidth of excited and received ultrasonic waves $W_{AB,I}$, $W_{AB,II}$, $W_{BA,I}$, $W_{BA,II}$, wherein the actual resonance frequencies of the Lamb wave oscillation modes, i.e. the particular positions of the resonance frequencies in the frequency range are only approximately known, i.e. can only be approximately estimated based on the earlier known characteristic values of the measuring system, for example, the material and the wall thickness of the pipe wall 10a.

As a result, an influence of Lamb wave oscillation modes of the pipe possibly excited by means of the ultrasonic transducer A, equally as well in unknown number, and unknown intensity, on the beam angle $\alpha_F$—in such a manner that during operation a non-quantifiable angular deviation $\Delta\alpha_F$ ($\alpha_F = \alpha_{F,nom} + \Delta\alpha_F$), i.e. a non-quantifiable angular error, exists between the (instantaneous) beam angle $\alpha_F$ and the earlier calculated nominal beam angle $\alpha_{F,nom}$—is not directly measurable during operation, i.e. the influence of the actually excited Lamb wave oscillation modes cannot be appropriately taken into consideration in the calculating of the at least one measured value. Equally not measurable, or only inaccurately measurable, is an associated path length error, namely a deviation $\Delta L$ ($L = L_{nom} + \Delta L$), of the path length L from the nominal path length $L_{nom}$. Investigations have, in such case, shown that the above-mentioned angular error $\Delta\alpha_F$, and, associated therewith, also the path length error $\Delta L$, can be significantly minimized or even prevented, by so selecting the frequency $f_{xA'}$ of the dominating signal component $x_A'$ of the driver signal $x_A(t)$ that it corresponds at least approximately to one of the resonance frequencies of the Lamb wave oscillation modes.

Figure 6A:
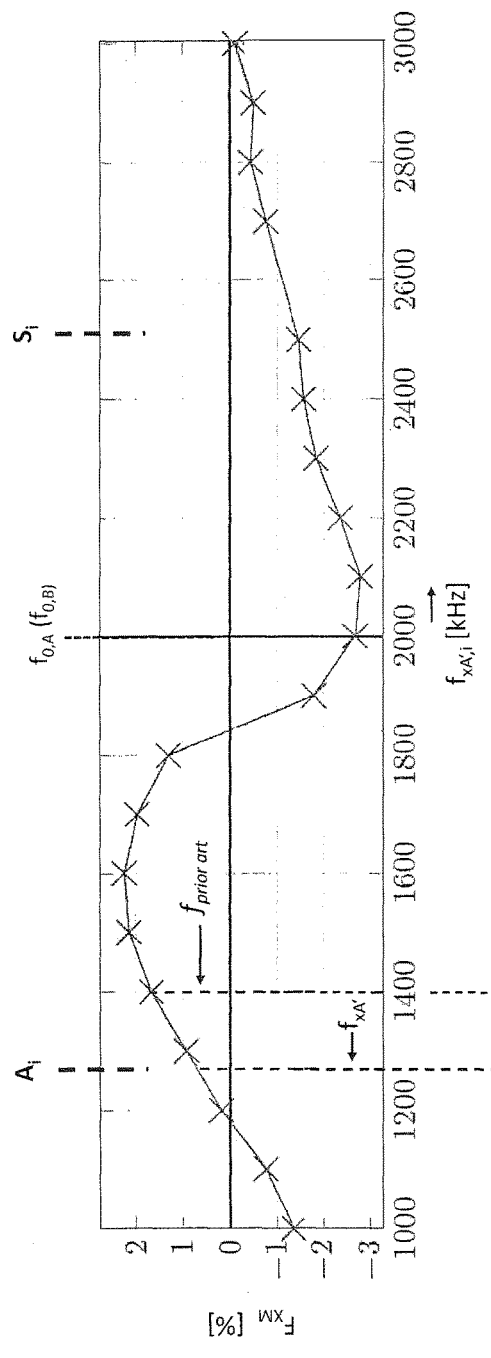

Further investigations on measuring systems of the type being discussed have surprisingly additionally shown that— as well as also evident from FIG. 6a-even for the case that the frequency $f_{xA'}$ of the signal component $x_A'$ deviates by less than 100 kHz, in given cases, even by less than 50 kHz, from a resonant frequency of one of the Lamb wave oscillation modes, respectively by less than 10%, in given cases, also by less than 5%, of a resonant frequency of one of the Lamb wave oscillation modes from such resonant frequency, for measuring systems of the type being discussed, not least of all also measuring systems embodied as a clamp-on, ultrasonic, flow measuring devices, an accuracy of measurement can be achieved, which is significantly improved compared with the measurement accuracies previously reachable with conventional measuring systems, and, inversely, a relative measuring error $E_{XM}$ (<2%) can be achieved, which is clearly lessened compared with relative measurement errors of conventional measuring systems (≥2%), for example, namely almost halved. This can be attributed, for example, to the fact that, in this way, it can be achieved and assured that at least in normal measuring operation of the measuring system exactly one of the Lamb wave oscillation modes lying within the 6 dB-bandwidths $BW_{A,6\,dB}$, $BW_{B,6\,dB}$ of the respective ultrasonic transducers A, B, as well as also the 6 db-bandwidth $BW_{xA,6dB}$ of the driver signal $x_A(t)$, consequently within a transmission-, respectively working range of the measuring system co-determined by these 6 dB-bandwidths, is dominatingly excited, namely with an intensity increased by not less than 10 dB, as compared with a maximum intensity, with which some other Lamb wave oscillatory mode possibly lying with its resonant frequency within the 6 dB-bandwidths $BW_{A,6\,dB}$, $BW_{B,6\,dB}$ of the ultrasonic transducer A, and B, is excited, i.e. that the oscillations executed by the pipe wall in the dominating excited Lamb wave oscillatory mode (dominant Lamb wave oscillatory mode) accordingly have an oscillation amplitude mentionably increased in comparison to possible oscillations of the pipe wall in the remaining Lamb wave oscillation modes of the pipe wall, namely higher by >10 dB (FIG. 4b). Conversely, it can, thus, be achieved in very simple manner that at least in normal measuring operation of the measuring system that, except for the one dominant Lamb wave oscillatory mode, no further Lamb wave oscillatory mode of the pipe lying with its resonant frequency within the previously indicated transmission-, and working range of the measuring system is mentionably excited, namely with an intensity reduced in comparison with the intensity of the dominant Lamb wave mode of oscillation by less than at least 10 dB (FIG. 4b); this—not least of all also with application of conventional ultrasonic transducers, i.e. ultrasonic transducers with conventional manner of construction—even for the typical case, in which the exact resonance frequencies of the Lamb wave oscillation modes are not known, i.e. the exact frequency spectrum of the pipe is not known, this also for the especially critical cases as regards measurement accuracy that—, as well as also evident from FIG. 6a—at least one of the two center frequencies $f_{0,A}$, $f_{0,B}$ deviates from each of the above mentioned resonance frequencies by more than 5% of the respective resonant frequency ($A_i$); this is in the case of application of conventional ultrasonic transducers regularly also true in the case of pipes with a pipe wall thickness of less than 10 mm.

Figure 6B:
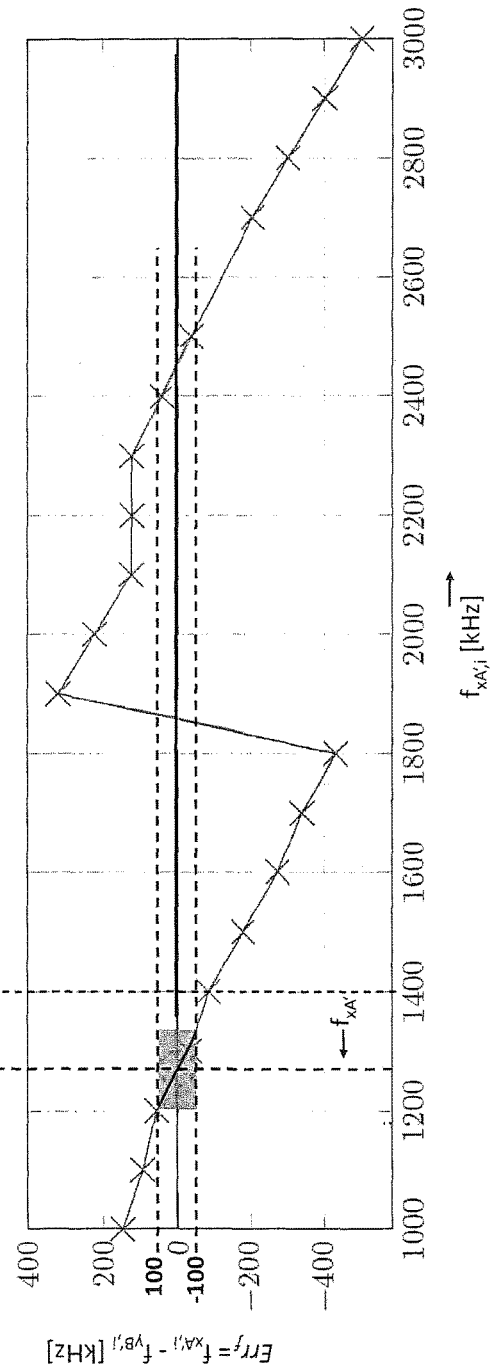
FIG. 6b deviation of a frequency of a dominating signal component of a driver signal having voltage level as a function of time as in FIG. 2a, or 3a, from a frequency of a dominating signal component of a received signal generated by means of the driver signal, as a function of the frequency of the dominating signal component of the driver signal.

In order to achieve and assure that at least in a normal measuring operation of the measuring system, i.e. at least during a measurement interval required for ascertaining the measured value by the ultrasonic transducer A—, as well as also shown in FIG. 6a, and evident from a combination of FIGS. 6a and 6b—as much as possible only exactly one Lamb wave oscillatory mode ($A_i$) of the tube, equally as well no others of the Lamb wave oscillation modes ($S_i$) of the tube 10 lying, in given cases, also within the transmission-, i.e. working, range of the measuring system are mentionably excited at its resonant frequency, the operating- and measuring electronics 2 of the measuring system of the invention is, consequently, additionally, adapted so to generate the driver signal $x_A(t)$ of said ultrasonic transducer A that—, as well as also shown in FIG. 6b—a frequency $f_{xA'}$ of the dominating signal component $x_A'$ of the driver signal $x_A(t)$ deviates by a magnitude of no more than |±100 kHz|, especially by a magnitude of less than |±50 kHz|, from a frequency $f_{yB'}$ of the dominating signal component $y_B'$ of the received signal $y_B(t)$ of the ultrasonic transducer B and/or by no more than 10%, especially by less than 5%, of the frequency $f_{yB'}$ of the dominating signal component $y_B'$ of the received signal $y_B(t)$ from such frequency $f_{yB'}$. This can be achieved e.g. in that the operating- and measuring electronics 2, firstly, so tailors the driver signal $x_A(t)$ that its dominating signal component $x_A'$ has an initial frequency $f_{xA'}$, namely one set to a predetermined start frequency value, in such a manner that a deviation of the (initial) frequency $f_{xA'}$ from the frequency $f_{yB'}$ of the dominating signal component $y_B'$ of the so generated received signal $y_B(t)$ is, firstly, more than an instantaneously achievable minimum, ultimately achieved deviation $Err_f$, for example, also in such a manner that the deviation between initial frequency $f_{xA'}$ and corresponding frequency $f_{yB'}$ amounts, firstly, to more than |±100 kHz|. Accordingly, the operating- and measuring electronics is, according to an additional embodiment of the invention, adapted to change the frequency $f_{xA'}$ of the dominating signal component $x_A'$ of the driver signal $x_A(t)$, for example, also step-wise ($f_{xA',i}$), not least of all also in order successively to lessen the above-mentioned deviation of the frequency $f_{xA'}$ from the frequency $f_{yB'}$ and/or in order to minimize a, firstly, too large deviation of the frequency $f_{xA'}$ from the frequency $f_{yB'}$, namely as exactly as possible to set an instantaneously achievable, minimum deviation $Err_f$, or to set the frequency $f_{xA'}$ to a corresponding (optimal) working frequency value, for example, namely —, as well as also in FIG. 6b shown, and evident from a combination of FIGS. 3b, 4b and 6b-1.25 MHz for the measuring system underpinning the (normalized) frequency spectra shown in FIGS. 3b and 4b. Serving as start frequency value can be, for example, a frequency value derived from at least one parameter of at least one of the two ultrasonic transducers A, B—, for example, namely at least one of the previously indicated limit-, respectively center frequencies $f_{d,A}$, $f_{d,B}$, $f_{u,A}$, $f_{u,B}$, $f_{0,A}$, $f_{0,B}$—or, however, also a value estimated based on earlier ascertained, nominal identifying data of the tube, for example, also furnished in the operating- and measuring electronics 2, for a resonant frequency of one of the Lamb wave modes of oscillation of the pipe lying within the previously indicated transmission-, or working, range of the measuring system. The start frequency value can, however, for example, also, firstly, be a frequency $f_{xA'}$ ($f_{prior\ art} \rightarrow f_{xA'}$), firstly, ascertained according to a conventional method directed, for example, at maximizing a signal power of the received signal for the driver signal $x_A(t)$. For the already mentioned case, in which the voltage $u_{A,I}$ of the driver signal $x_A(t)$ is embodied as a sequence of pulse packets following one after the other with a time separation corresponding to the shot rate $1/T_S$ and having two or more voltage pulses (FIG. 2a, FIG. 3a), the frequency $f_{xA'}$ of the dominating signal component $x_A'$ of the driver signal $x_A(t)$ corresponds, as directly evident from a combination of FIGS. 2a and 2b, and FIGS. 3a and 3b, for example, to a pulse sequence frequency of the voltage pulses formed within a respective pulse packet, which pulse sequence frequency corresponds to a reciprocal value of a (pulse packet internal) period length $T_x$ of an individual voltage pulse. Accordingly, the frequency $f_{xA'}$ of the dominant signal component $x_A'$ of the driver signal $x_A(t)$ can be suitably set by means of the operating- and measuring electronics 2, for example, by setting the period length $T_x$ to a value desired for the frequency $f_{xA'}$, along with a corresponding change of the packet length $T_1$ ($T_i = N \cdot T_x$) and/or with a corresponding change of the number N ($N = T_x/T_i$) of rectangular pulses contained in a pulse packet. Moreover, the frequency of the dominating signal component $x_A'$ of the driver signal $x_A(t)$ for the ultrasonic transducer A can, for example, also be changed as a function of time, in that voltage pulses generated by means of the operating- and measuring electronics and following one after the other in time have different pulse widths, or in that rectangular voltage pulses formed to a first pulse packet are generated with a pulse width, which deviates from a pulse width, with which rectangular voltage pulses, generated subsequently to the first pulse packet and formed, for example, to a second pulse packet, are produced.

For the previously indicated case, in which there is provided in the operating- and measuring electronics 2 a data memory MEM serving for storing digital data generated during operation of the measuring system, consequently a writable data memory MEM, the above-mentioned starting value can be stored as a parameter value $V_{f0}$ for a setting parameter characterizing the driver signal $x_A(t)$, here namely the initial frequency, firstly, to be set for the dominating signal component $x_A'$ at a start-up, i.e. at a first start up or also a re-start of the measuring system. Alternatively or supplementally to storing the starting value in the data memory MEM, after finding the working frequency value for the frequency $f_{xA'}$ suitable for operation of the measuring system, such working frequency value can be stored in the data memory MEM as parameter value $V_{fx}$ for an (additional) setting parameter characterizing the driver signal $x_A(t)$—here namely the optimal frequency to be set as exactly as possible in normal measuring operation for the dominating signal component $x_A'$ for obtaining a minimum deviation of the frequency $f_{xA'}$ from the frequency $f_{yB'}$,—to be stored, in given cases, also together with a corresponding time value (time stamp), for example, in the form of a date and/or a clock time. By applying the parameter values stored in the data memory MEM for the one or more setting parameters characterizing the driver signal $x_A(t)$, not least of all the parameter value $V_{fx}$, additionally a check of the ability of the measuring system to function can be performed recurringly during operation, for example, in that, at times, the above-mentioned optimal frequency $f_{xA'}$ for the dominating signal component $x_A'$ of the driver signal is ascertained anew and a currently ascertained optimal frequency $f_{xA'}$ compared with an earlier ascertained optimal frequency in the form of the stored parameter value $V_{fx}$, and, in the case of a possible deviation between the two optimal frequencies, a lessened ability to function, i.e. a disturbance of the measuring system, is registered. This can happen, for example, as a result of a degradation of the pipe, such as, for instance, a change of a wall thickness of the pipe wall, and/or as a result of a change of a transfer function of at least one of the two ultrasonic transducers A, B. Accordingly, the operating- and measuring electronics 2, according to an additional embodiment of the invention, is also adapted to apply parameter values stored in the data memory MEM for the at least one setting parameter characterizing the driver signal for the ultrasonic transducer A to perform a checking of an ability of the measuring system to function, for example, a checking of an ability of ultrasonic transducer A to function and/or of ultrasonic transducer B to function and/or a checking of an integrity of the pipe.

The, in contrast to the frequency $f_{xA'}$, firstly, still not known, (instantaneous) frequency $f_{yB'}$ of the dominating signal component $y_B'$ of the received signal $y_B(t)$ still required supplementally to the frequency $f_{xA'}$ for ascertaining the deviation of the frequency $f_{xA'}$ from the frequency $f_{yB'}$, a deviation amounting in the case of the measuring system of the invention in normal measuring operation to less than $|\pm 100\ kHz|$, can be ascertained by means of the operating- and measuring electronics 2 during operation of the measuring system recurringly based on the received signal $y_B(t)$, for example, based on an amplitude spectrum $|Y_B|$ (magnitude of a frequency spectrum) of the received signal $y_B(t)$ ascertained during operation, or based on a maximum value and its corresponding frequency ascertained for the amplitude spectrum $|Y_B|$. The maximum value shown in FIG. 4b in the case of the normalized amplitude spectrum $|Y_B^*|$ amounting to 0 dB (decibel) corresponds to the spectral signal component of the received signal $y_B(t)$ with the greatest amplitude, i.e. the greatest power spectral density ($S_{yyB,MAX}$), and, thus, to the sought, dominating, spectral signal component $y_B'$ of the received signal $y_B(t)$. Accordingly, the operating- and measuring electronics is, according to an additional embodiment of the invention, not least of all also for ascertaining the frequency $f_{yB'}$ of the dominating signal component $y_B'$ of the received signal $y_B(t)$ of the ultrasonic transducer B, additionally, adapted to ascertain an amplitude spectrum $|Y_B|$ of the received signal $y_B(t)$ of the ultrasonic transducer B, e.g. a normalized amplitude spectrum $|Y_B^*|$ of the received signal $y_B(t)$, for example, based thereon, to ascertain the power and/or the amplitude and/or the frequency $f_{yB'}$ of the dominating signal component $y_B'$ of the received signal $y_B(t)$ of the ultrasonic transducer B. Alternatively or supplementally, the operating- and measuring electronics can be adapted, in given cases, also to ascertain, or to calculate, a normalized power density spectrum (PSD) of the received signal $y_B(t)$, in order thereafter to ascertain the dominating spectral signal component $y_B'$, in particular the frequency $f_yB'$, of the received signal $y_B(t)$, using the power density spectrum. For the previously indicated case, in which the operating- and measuring electronics 2 is adapted to convert the received signal $y_B(t)$ into a corresponding digital received signal $y_{Bd}$, the operating- and measuring electronics can, furthermore, also be adapted, for ascertaining the amplitude spectrum $|Y_B|$ of the received signal $y_B(t)$, firstly, to generate a discrete Fourier transformation (DFT→$|Y_B|$) of the digital received signal $y_{Bd}$ and thereafter to ascertain the amplitude and/or the power and/or the frequency $f_{yB'}$ of the dominating signal component $y_B'$ of the received signal $y_B(t)$ based on the discrete Fourier transformation. For the previously indicated case, in which the operating- and measuring electronics 2 is adapted also to provide a received signal $y_A(t)$ of the ultrasonic transducer A as well as a digital received signal $y_{ad}$ representing the received signal $y_A(t)$, the operating- and measuring electronics 2 can, furthermore, also be adapted to ascertain the frequency $f_{yA'}$ of the dominating signal component $y_A'$ of the received signal $y_A(t)$ correspondingly based on a discrete Fourier transformation (DFT) of the digital received signal $y_{ad}$ internally generated by the operating- and measuring electronics.

Taking into consideration the earlier quite determinable characteristic transfer behavior of each of the ultrasonic transducers A and B, not least of all also their respective actual 6 dB-bandwidths $BW_{A,6\ dB}$ and $BW_{B,6\ dB}$ and/or their actual amplitude- and/or phase frequency response or also their transfer functions (system functions), and the contribution of the ultrasonic transducers A and B resulting therefrom to the characteristic transfer behavior of the total measuring path lying between the electrical driver signal $x_A(t)$ and the electrical received signal $y_B(t)$, namely the path formed by means of the ultrasonic transducers A, B, the measuring tube 10 as well as the fluid FL guided therein, the accuracy of measurement of the measuring system can, when required, be even still further improved, for example, by matching the driver signal $x_A(t)$ through corresponding embodying of its frequency spectrum, and corresponding selection of its bandwidth, to the transfer behavior of the ultrasonic transducers A, B. In an additional embodiment of the invention, the operating- and measuring electronics is, consequently, additionally, adapted so to generate the driver signal $x_A(t)$, for example, namely so to set the frequency $f_{xA'}$ of the dominating signal component $x_A'$ of the driver signal $x_A(t)$, or so to set the above mentioned working frequency value, that the frequency $f_{xA'}$ of the dominating signal component $x_A'$ of the driver signal $x_A(t)$ deviates by no more than 10%, as much as possible by less than 5%, of the center frequency $f_{0,A}$ of the 6 dB-bandwidth, $BW_{A,6\ dB}$, of the ultrasonic transducer A from the frequency $f_{yB'}$ of the dominating signal component $y_B'$ of the received signal, and/or that the frequency $f_{xA'}$ of the dominating signal component $x_A'$ of the driver signal $x_A(t)$ for the ultrasonic transducer A deviates by no more than 10%, as much as possible less than 5%, of the center frequency $f_{0,B}$ of the 6 dB-bandwidth $BW_{B,6\ dB}$ of the ultrasonic transducer B from the frequency $f_{yB'}$ of the dominating signal component $y_B'$ of the received signal.

For the previously indicated case, in which each of the two ultrasonic transducers A, B is adapted to be operated intermittently as a transmitter converting electrical power into sound power, and as a receiver transducing sound power into electrical power, and, accordingly, the operating- and measuring electronics 2 is adapted, for effecting the received signal $y_A(t)$ of the ultrasonic transducer A, to generate at times, especially complementarily to the driver signal $x_A(t)$, also a driver signal $x_B(t)$ for ultrasonic transducer B, the operating- and measuring electronics 2 is, according to an additional embodiment of the invention, furthermore, also adapted so to generate the driver signal $x_B(t)$ for the ultrasonic transducer B that both the driver signal $x_B(t)$ and also the received signal $y_A(t)$ of the ultrasonic transducer A contain a plurality of spectral signal components $x_{B,i}$, $y_{A,i}$, equally as well, in each case, a dominating spectral signal component $x_B'$, $y_A$, namely a spectral signal component $x_B'$, $y_A$, having, in each case, a maximum power spectral density $S_{xxB,MAX}$; $S_{yyA,MAX}$,'; this especially also in the manner that a frequency $f_{xB'}$ of the dominating signal component $x_B'$ of the driver signal $x_B(t)$ deviates by no more than a magnitude of |±100 kHz|, for example, namely also by a magnitude of less than |±50 kHz|, from a frequency $f_{yA'}$ of the dominating signal component $y_A'$ of the received signal $y_A(t)$ of the ultrasonic transducer A and/or by no more than 10%, especially by less than 5%, of the frequency $f_{yA'}$ of the dominating signal component $y_A'$ of the received signal $y_A(t)$ of the ultrasonic transducer A from such frequency $f_{yA'}$, and/or that the frequency $f_{xB'}$ deviates by a magnitude of no more than |±50 kHz|, especially by a magnitude of less than |±10 kHz|, from the frequency $f_{xA'}$ of the dominating signal component $x_A'$ of the driver signal $x_A(t)$, or by no more than 1% of the frequency $f_{xA'}$ from such frequency $f_{xA'}$. The driver signal $x_B(t)$ can, for example, be so embodied that it has a level as a function of time, which is only time shifted compared with a level as a function of time for the driver signal $x_A(t)$, for example, by a time value corresponding to a half shot rate ($0.5 \cdot T_S$), but otherwise corresponds to the level of the driver signal $x_A(t)$ as a function of time, at least for a predetermined time interval ($>>2 \cdot T_S$). Accordingly, the operating- and measuring electronics 2 is, according to an additional embodiment of the invention, furthermore, also adapted to modulate the voltage $u_{B,I}$ of the driver signal $x_B(t)$ for the ultrasonic transducer B, for example, namely to clock it; this, especially, in equal manner to the case of the driver signal $x_A(t)$, or in such a manner that the voltage $u_{B,I}$ is embodied as a sequence having, in each case, two or more rectangular voltage pulses and/or sequential pulse packets with a predetermined time separation. Moreover, the operating- and measuring electronics 2 can also be embodied to change the frequency $f_{xB'}$ during operation, for instance, to lessen its deviation $f_{xB'}$ from the frequency $f_{yA'}$ of the dominating signal component $y_A'$ of the received signal $y_A(t)$ of the ultrasonic transducer A, or correspondingly to match the frequency $f_{xB'}$ to the frequency $f_{xA'}$.

The invention claimed is:

1. A measuring system for measuring at least one parameter, said measuring system comprising:
   a tube, with a lumen surrounded by a tube wall, which tube is adapted to guide a volume portion of the fluid in its lumen;
   a first ultrasonic transducer mounted on the tube on an outside of the tube wall facing away from the lumen, and acoustically coupled via the tube wall to fluid guided in the lumen, said ultrasonic transducer being adapted to convert a time varying, electrical voltage into ultrasonic waves propagating through the tube wall and further through fluid guided in the lumen;

a second ultrasonic transducer mounted on the tube separated from said first ultrasonic transducer on the outside of the tube wall and acoustically coupled via the tube wall to fluid guided in the lumen, said second ultrasonic transducer being adapted to receive ultrasonic waves propagating through fluid guided in the lumen, and further through the tube wall and to transduce such into an electrical voltage varying as a function of time; and an operating- and measuring electronics electrically connected both with said first ultrasonic transducer as well as also with said second ultrasonic transducer, wherein:

said operating- and measuring electronics is adapted to generate a driver signal for said first ultrasonic transducer the driver signal includes a time variable for effecting a received signal of said second ultrasonic transducer likewise including an electrical voltage varying as a function of time, in such a manner:

that both the driver signal as well as also the received signal, each contain a plurality of spectral signal components equally as well, in each case, a dominating spectral signal component, said dominating spectral signal component showing, in each case, a maximum power spectral density, and that a frequency of the dominating signal component of the driver signal for the first ultrasonic transducer deviates by a magnitude of no greater than |±100 kHz from a frequency of the dominating signal component of the received signal of said second ultrasonic transducer and/or by no more than 10% of the frequency of the dominating signal component of the received signal of said second ultrasonic transducer from such frequency; and said operating- and measuring electronics is adapted to produce by means of the received signal of said second ultrasonic transducer at least one measured value for the at least one parameter.

2. The measuring system as claimed in claim 1, wherein: the tube shows Lamb wave oscillation modes, in which the tube wall executes, or can execute, oscillations forming Lamb waves; and said operating- and measuring electronics is adapted so to generate the driver signal for said first ultrasonic transducer that the frequency of the dominating signal component of the driver signal deviates from a resonant frequency of one of the Lamb wave oscillation modes by a magnitude of less than |±100 kHz and/or from such resonant frequency by less than 10% of a resonant frequency of one of the Lamb wave oscillation modes.

3. The measuring system as claimed in claim 1, wherein: said operating- and measuring electronics is adapted to change the frequency of the dominating signal component of the driver signal for said first ultrasonic transducer in order to lessen a deviation of such frequency from the dominating signal component of the received signal of said second ultrasonic transducer and/or in such a manner that a, firstly, too large deviation of such frequency from the frequency of the dominating signal component of the received signal of said second ultrasonic transducer is minimized.

4. The measuring system as claimed in claim 1, wherein: said operating- and measuring electronics is adapted to ascertain an amplitude spectrum of the received signal of said second ultrasonic transducer; and/or said operating- and measuring electronics is adapted to ascertain a power and/or an amplitude of the dominating signal component of the received signal of said second ultrasonic transducer of the received signal; and/or wherein the operating- and measuring electronics is adapted to ascertain the frequency of the dominating signal component of the received signal of said second ultrasonic transducer of the received signal.

5. The measuring system as claimed in claim 1, wherein: said operating- and measuring electronics is adapted to modulate the electrical voltage of the driver signal for said first ultrasonic transducer in such a manner that the electrical voltage is embodied as a sequence of voltage pulses; and said operating- and measuring electronics is adapted to change the frequency of the dominating signal component of the driver signal for said first ultrasonic transducer as a function of time, in that voltage pulses generated following one after the other in time have different pulse widths.

6. The measuring system as claimed in claim 1, wherein: said operating- and measuring electronics is adapted to produce the at least one measured value both by means of the received signal of said second ultrasonic transducer as well as also by means of the driver signal for said first ultrasonic transducer.

7. The measuring system as claimed in claim 1, wherein: said second ultrasonic transducer is adapted to convert an electrical voltage varying as a function of time into ultrasonic waves propagating through the tube wall and further through fluid guided in the lumen; and said first ultrasonic transducer is adapted to receive ultrasonic waves propagating through fluid guided in the lumen, and further through the tube wall and to transduce such into an electrical voltage varying as a function of time.

8. The measuring system as claimed in claim 1, wherein: the tube wall shows a wall thickness, which is more than 2 mm and/or less than 10 mm; and/or the tube wall is composed of a metal, especially a steel.

9. The measuring system as claimed in claim 1, wherein: the tube is embodied as a pipe forming an integral component of a pipeline.

10. The measuring system as claimed in claim 1, wherein: the tube is inserted into the course of a pipeline.

11. The measuring system as claimed in claim 1, wherein: said first ultrasonic transducer is formed by means of a piezoelectric transducer element as well as by means of a coupling body sound conductingly coupled with the transducer element; and/or said second ultrasonic transducer is formed by means of a piezoelectric transducer element as well as by means of a coupling body sound conductingly coupled with the transducer element.

12. The measuring system as claimed in claim 1, wherein: said first ultrasonic transducer is adapted to be operated intermittently as a transmitter converting electrical power into sound power, or as a receiver transducing sound power into electrical power; and/or said second ultrasonic transducer is adapted to be operated intermittently, especially complementarily to the first ultrasonic transducer, as a receiver transducing sound power into electrical power, or as a transmitter converting electrical power into sound power.

13. Use of a measuring system as claimed in claim 1 for measuring a flow velocity and/or a volume flow rate and/or a density of a fluid flowing in a pipeline.

14. The measuring system as claimed in claim 1, wherein:
said first ultrasonic transducer shows a 6 dB bandwidth extending between a downwards located, first limit frequency of said first ultrasonic transducer and an upwards located, second limit frequency of said ultrasonic transducer and said second ultrasonic transducer shows a 6 dB bandwidth extending between a downwards located, first limit frequency of second ultrasonic transducer and an upwards located, second limit frequency of second ultrasonic transducer;
said operating- and measuring electronics is adapted so to generate the driver signal, for said first ultrasonic transducer;
that the frequency of the dominating signal component of the driver signal for said first ultrasonic transducer deviates from the frequency of the dominating signal component of the received signal by no more than 10% of a center frequency of the 6 dB bandwidth of said first ultrasonic transducer, defined as a geometrical average of its first limit frequency and its second limit frequency and/or
that the frequency of the dominating signal component of the driver signal for the first ultrasonic transducer deviates from the frequency of the dominating signal component of the received signal by no more than 10% of a center frequency of the 6 dB bandwidth of said second ultrasonic transducer, defined as a geometrical average of its first limit frequency and its second limit frequency.

15. The measuring system as claimed in claim 14, wherein:
the center frequency of the 6 dB bandwidth of said first ultrasonic transducer deviates from the resonant frequency of the Lamb wave mode of oscillation by more than 5% of such resonant frequency; and/or
the center frequency of the 6 dB bandwidth of said second ultrasonic transducer deviates from the resonant frequency of the Lamb wave mode of oscillation by more than 5% of such resonant frequency.

16. The measuring system as claimed in claim 1, wherein:
said operating- and measuring electronics is adapted to modulate the voltage of the driver signal for said first ultrasonic transducer.

17. The measuring system as claimed in claim 16, wherein:
said operating- and measuring electronics is adapted to modulate the voltage of the driver signal for said first ultrasonic transducer in such a manner that the voltage is embodied as a sequence of pulse packets.

18. The measuring system as claimed in claim 17, wherein:
said operating- and measuring electronics is adapted to change the frequency of the dominating signal component of the driver signal for said first ultrasonic transducer as a function of time, in that rectangular voltage pulses of a first pulse packet are generated with a pulse width, which deviates from a pulse width, with which rectangular voltage pulses generated after the first pulse packet are generated.

19. The measuring system as claimed in claim 1, wherein:
said operating- and measuring electronics is adapted so to generate the driver signal for said first ultrasonic transducer that the dominating signal component of the driver signal, exhibits, firstly, an initial frequency adjusted to a predetermined start frequency value in such a manner that a deviation of the initial frequency of the dominating signal component of the driver signal for said first ultrasonic transducer from the frequency of the dominating signal component of the received signal of said second ultrasonic transducer is greater than an instantaneously achievable minimum deviation of the frequency of the dominating signal component of the driver signal for said first ultrasonic transducer from the frequency of the dominating signal component of the received signal of the second ultrasonic transducer and/or in such a manner that a deviation of the frequency of the dominating signal component of the driver signal for said first ultrasonic transducer from the frequency of the dominating signal component of the received signal of said second ultrasonic transducer amounts, firstly, to more than |±100 kHz| and/or more than 10% of the frequency of the dominating signal component of the received signal of said second ultrasonic transducer.

20. The measuring system as claimed in claim 19, wherein:
said operating- and measuring electronics is adapted starting from the initial frequency at least to change the frequency of the dominating signal component of the driver signal for said first ultrasonic transducer until the frequency of the dominating signal component of the driver signal for said first ultrasonic transducer deviates by no more than |±100 kHz| from the frequency of the dominating signal component of the received signal of said second ultrasonic transducer and/or by no more than 10% of the frequency of the dominating signal component of the received signal of said second ultrasonic transducer from such frequency and/or until a, firstly, too large deviation of the frequency of the dominating signal component of the driver signal for said first ultrasonic transducer from the frequency of the dominating signal component of the received signal of said second ultrasonic transducer is adjusted to an instantaneously achievable, minimum deviation of the frequency of the dominating signal component of the driver signal for said first ultrasonic transducer from the frequency of the dominating signal component of the received signal of said second ultrasonic transducer.

21. The measuring system as claimed in claim 1, wherein:
said operating- and measuring electronics is adapted, for effecting a received signal of said first ultrasonic transducer showing an electrical voltage varying as a function of time at least at times, to generate a driver signal for said second ultrasonic transducer showing an electrical voltage variable as a function of time.

22. The measuring system as claimed in claim 21, wherein:
said operating- and measuring electronics is adapted to produce the at least one measured value both by means of the received signal of said second ultrasonic transducer as well as also by means of the received signal of said first ultrasonic transducer; and/or
said operating- and measuring electronics is adapted to produce the at least one measured value both by means of the driver signal for said first ultrasonic transducer as well as the received signal of said second ultrasonic transducer as well as also by means of the driver signal for said second ultrasonic transducer as well as the received signal of said first ultrasonic transducer.

23. The measuring system as claimed in claim 21, wherein:
said operating- and measuring electronics is adapted to convert the received signal of said first ultrasonic transducer into a digital received signal representing the received signal; and
said operating- and measuring electronics is adapted to produce the at least one measured value for the at least one parameter by means of the digital received signal representing the received signal of said first ultrasonic transducer.

24. The measuring system as claimed in claim 21, wherein:
said operating- and measuring electronics is adapted so to generate the driver signal for said second ultrasonic transducer that both the driver signal
as well as also the received signal of said first ultrasonic transducer each contain a plurality of spectral signal components equally as well, in each case, a dominating spectral signal component, said dominating spectral signal component showing in each case, maximum power spectral density of the driver signal and the received signal, respectively.

25. The measuring system as claimed in claim 24, wherein:
said operating- and measuring electronics is adapted to modulate the voltage of the driver signal for said second ultrasonic transducer; and/or
said operating- and measuring electronics is adapted to generate a sequence of pulse packets serviceable as a driver signal for said second ultrasonic transducer; and/or
said operating- and measuring electronics is adapted to change the frequency of the dominating signal component of the driver signal for said second ultrasonic transducer; and/or
said operating- and measuring electronics is adapted to generate the driver signal for said second ultrasonic transducer complementarily to the driver signal for said first ultrasonic transducer.

26. The measuring system as claimed in claim 21, wherein:
said operating- and measuring electronics is adapted so to generate the driver signal for said second ultrasonic transducer that a frequency of the dominating signal component of the driver signal for said second ultrasonic transducer deviates by no more than a magnitude of |±100 kHz| from a frequency of the dominating signal component of the received signal of said first ultrasonic transducer and/or by no more than 10% of the frequency of the dominating signal component of the received signal of the first ultrasonic transducer from such frequency; and/or
said operating- and measuring electronics is adapted so to generate the driver signal for said first ultrasonic transducer and the driver signal for said second ultrasonic transducer that a frequency of the dominating signal component of the driver signal for said second ultrasonic transducer deviates by a magnitude of no more than |±50 kHz| from a frequency of the dominating signal component of the driver signal for said first ultrasonic transducer and/or by no more than 1% of the frequency of the dominating signal component of the driver signal for said first ultrasonic transducer from such frequency.

27. The measuring system as claimed in claim 26, wherein:
said operating- and measuring electronics is adapted to generate a discrete Fourier transformation of the digital received signal representing the received signal of said first ultrasonic transducer; and
said operating- and measuring electronics is adapted to ascertain the frequency of the dominating signal component of the received signal of said first ultrasonic transducer based on the Fourier transformation.

28. The measuring system as claimed in claim 1, wherein:
said operating- and measuring electronics is adapted to convert the received signal of said second ultrasonic transducer into a digital received signal representing the received signal; and
said operating- and measuring electronics is adapted to produce the at least one measured value for the at least one parameter by means of the digital received signal representing the received signal of said second ultrasonic transducer.

29. The measuring system as claimed in claim 28, wherein:
said operating- and measuring electronics is adapted to produce the at least one measured value for the at least one parameter by means of the digital received signal representing the received signal of said first ultrasonic transducer as well as by means of the digital received signal representing the received signal of said second ultrasonic transducer.

30. The measuring system as claimed in claim 28, wherein:
said operating- and measuring electronics is adapted to generate a discrete Fourier transformation of the digital received signal, representing the received signal of said second ultrasonic transducer; and
said operating- and measuring electronics is adapted to ascertain the frequency of the dominating signal component of the received signal of said second ultrasonic transducer based on the discrete Fourier transformation.

31. The measuring system as claimed in claim 30, wherein:
said operating- and measuring electronics is adapted to ascertain, based on the discrete Fourier transformation, an amplitude and/or a power of the dominating signal component of the received signal of said second ultrasonic transducer.

32. The measuring system as claimed in claim 1, wherein:
said operating- and measuring electronics includes a data memory for storing digital data.

33. The measuring system as claimed in claim 32, wherein:
said operating- and measuring electronics is adapted to store parameter values for at least one setting parameter characterizing the driver signal for said first ultrasonic transducer recurringly in such data memory.

34. The measuring system as claimed in claim 33, wherein:
said operating- and measuring electronics is adapted by applying parameter values stored in the data memory for the at least one setting parameter characterizing the driver signal for said first ultrasonic transducer to perform a checking of an ability of the measuring system to function; and/or said operating- and measuring electronics is adapted with application of at least one parameter value stored in the data memory for the at least one setting parameter characterizing the driver signal for said first ultrasonic transducer to detect a degradation of the tube.

* * * * *